(12) United States Patent
McCrory et al.

(10) Patent No.: US 7,574,496 B2
(45) Date of Patent: Aug. 11, 2009

(54) VIRTUAL SERVER CLOUD INTERFACING

(75) Inventors: Dave D. McCrory, Destrehan, LA (US); Robert A. Hirschfeld, Metairie, LA (US)

(73) Assignee: Surgient, Inc., Austin, TX (US)

( * ) Notice: Subject to any disclaimer, the term of this patent is extended or adjusted under 35 U.S.C. 154(b) by 1546 days.

(21) Appl. No.: 10/124,195

(22) Filed: Apr. 17, 2002

(65) Prior Publication Data

US 2003/0105810 A1    Jun. 5, 2003

Related U.S. Application Data

(63) Continuation-in-part of application No. 10/100,216, filed on Mar. 18, 2002.

(60) Provisional application No. 60/334,253, filed on Nov. 30, 2001.

(51) Int. Cl.
*G06F 15/173* (2006.01)
(52) U.S. Cl. .................. 709/223; 709/224; 709/220; 709/226; 709/228; 709/238; 370/397; 370/399; 370/409; 370/352; 370/231; 370/235
(58) Field of Classification Search .............. 709/220, 709/223, 224, 226, 228, 238; 370/397, 399, 370/409, 352, 231, 235
See application file for complete search history.

(56) References Cited

U.S. PATENT DOCUMENTS

| | | | |
|---|---|---|---|
| 4,912,628 A | 3/1990 | Briggs | |
| 5,062,037 A | 10/1991 | Shorter et al. | |
| 5,201,049 A | 4/1993 | Shorter | |
| 5,611,050 A | 3/1997 | Theimer et al. | |
| 5,802,290 A | 9/1998 | Casselman | |
| 5,996,026 A * | 11/1999 | Onodera et al. | 710/3 |
| 5,999,518 A | 12/1999 | Nattkemper et al. | |
| 6,003,050 A * | 12/1999 | Silver et al. | 715/536 |
| 6,041,347 A * | 3/2000 | Harsham et al. | 709/220 |
| 6,067,545 A | 5/2000 | Wolff | |
| 6,069,894 A * | 5/2000 | Holender et al. | 370/397 |
| 6,075,938 A | 6/2000 | Bugnion et al. | |
| 6,104,699 A | 8/2000 | Holender et al. | |
| 6,185,601 B1 | 2/2001 | Wolff | |

(Continued)

OTHER PUBLICATIONS

Henry Baltazar, Virtual Storage Age, eWEEK, pp. 45 and 48, Aug. 27, 2001, Ziff Davis Media Inc., New York, New York.

(Continued)

*Primary Examiner*—Ario Etienne
*Assistant Examiner*—Barbara N Burgess
(74) *Attorney, Agent, or Firm*—Gary R. Stanford

(57) ABSTRACT

A server cloud manager (SCM) for controlling logical servers and physical resources that form a virtualized logical server cloud. The SCM includes multiple core components and one or more interface components. The core components serve as a shared foundation to collectively manage events, validate and authorize server cloud users and agents, enforce predetermined requirements and rules and store operation data. The one or more interface components enable communication with external entities and includes an SCM proxy manager that enables communication with one or more SCMs of other server clouds. A server cloud system including a first server cloud that includes a first server cloud manager (SCM) and a first logical server, and a second server cloud that includes a second SCM. The first and second SCMs are configured to cooperate to manage operation of the first logical server.

19 Claims, 12 Drawing Sheets

U.S. PATENT DOCUMENTS

| | | | |
|---|---|---|---|
| 6,256,637 B1 * | 7/2001 | Venkatesh et al. | 707/103 Y |
| 6,263,358 B1 | 7/2001 | Lee et al. | |
| 6,272,523 B1 | 8/2001 | Factor | |
| 6,272,537 B1 | 8/2001 | Kekic et al. | |
| 6,370,560 B1 | 4/2002 | Robertazzi et al. | |
| 6,496,847 B1 | 12/2002 | Bugnion et al. | |
| 6,567,839 B1 | 5/2003 | Borkenhagen et al. | |
| 6,633,916 B2 | 10/2003 | Kauffman | |
| 6,640,239 B1 | 10/2003 | Gidwani | |
| 6,985,937 B1 * | 1/2006 | Keshav et al. | 709/223 |
| 2002/0065864 A1 | 5/2002 | Hartsell et al. | |
| 2002/0129082 A1 | 9/2002 | Baskey et al. | |
| 2005/0249199 A1 * | 11/2005 | Albert et al. | 370/352 |

OTHER PUBLICATIONS

PCT Notification of Transmittal of the International Search Report or the Declaration, dated Feb. 25, 2003, 5 pages.

PCT Notification of Transmittal of the International Search Report or the Declaration, dated Mar. 28, 2003, 3 pages.

* cited by examiner

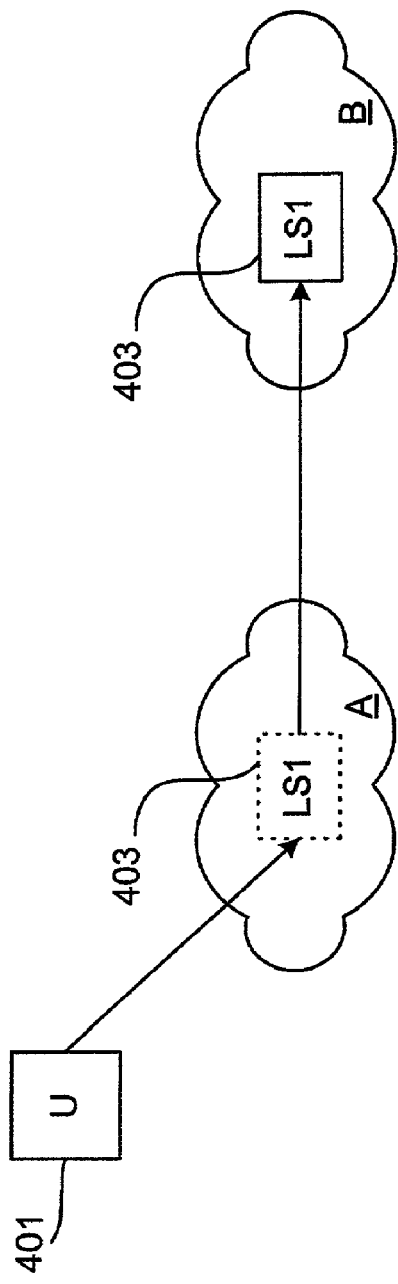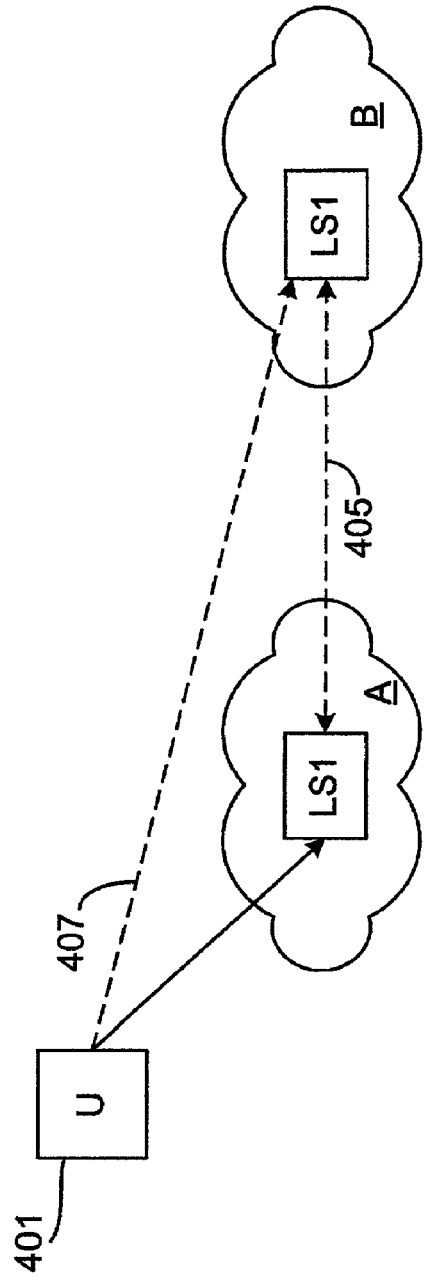
FIG. 4A
FIG. 4B

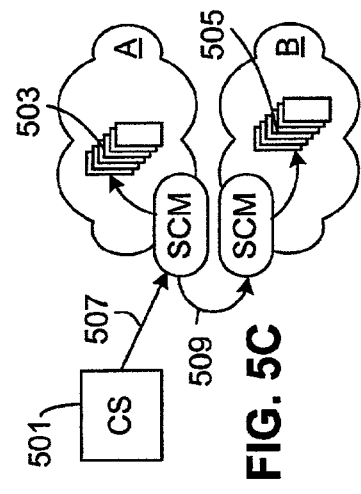
FIG. 5A
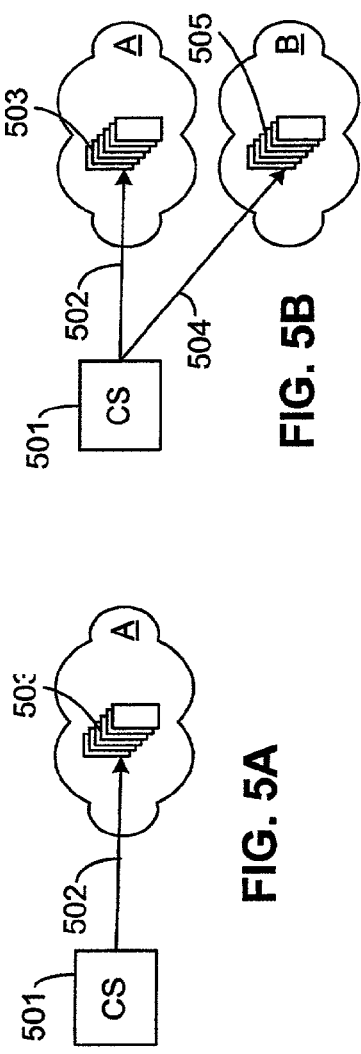
FIG. 5B
FIG. 5C
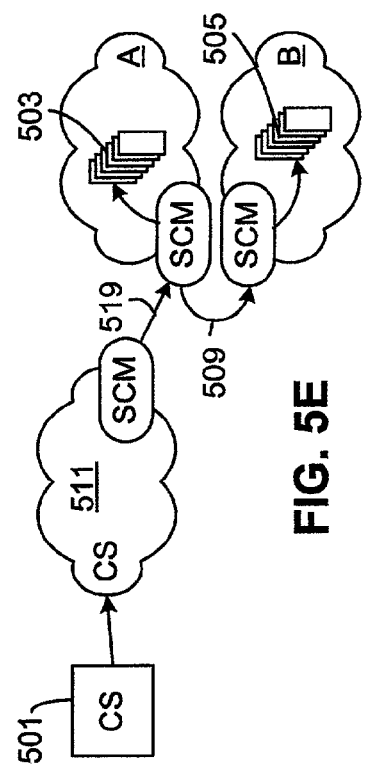
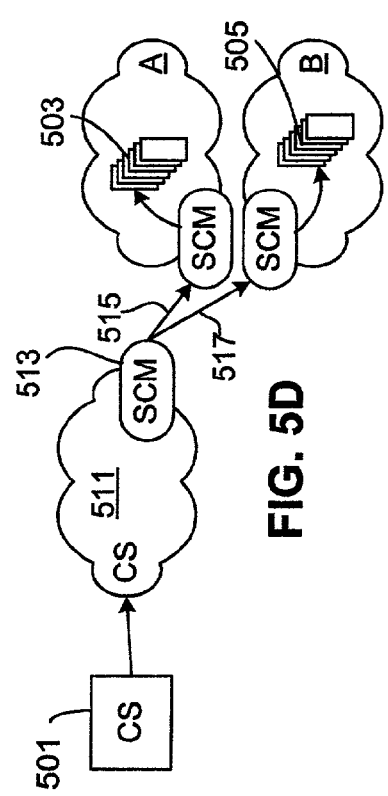
FIG. 5D
FIG. 5E
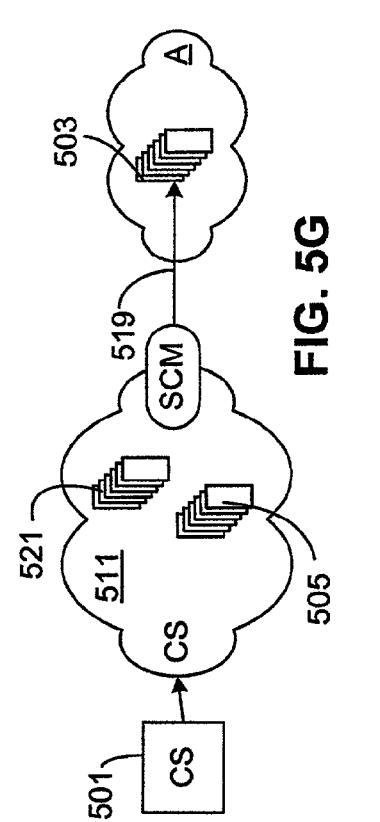
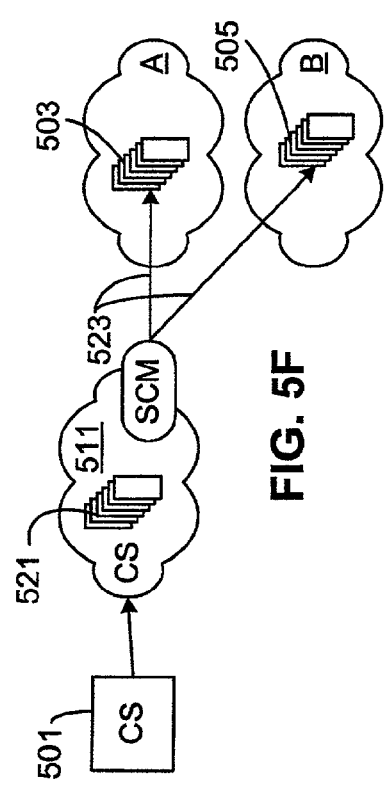
FIG. 5F
FIG. 5G

US 7,574,496 B2

VIRTUAL SERVER CLOUD INTERFACING

CROSS-REFERENCE TO RELATED APPLICATION(S)

The present application is based on U.S. Provisional Patent Application entitled "Virtual Server Cloud Interfacing", Ser. No. 60/334,253, filed Nov. 30, 2001 which is hereby incorporated by reference in its entirety. The present application is also a Continuation-In-Part of U.S. patent application entitled "Virtualized Logical Server Cloud", Ser. No. 10/100,216, filed Mar. 18, 2002, which is hereby incorporated by reference in its entirety.

FIELD OF THE INVENTION

The present invention relates to virtualization and server technology, and more particularly to server cloud interfacing for establishing flexible logical server management.

DESCRIPTION OF RELATED ART

There are many situations in which it is desired to lease one or more server computer systems on a short or long-term basis. Examples include educational or classroom services, demonstration of software to potential users or buyers, web-site server applications, etc. The servers may be pre-configured with selected operating systems and application software as desired. Although physical servers may be leased and physically delivered for onsite use, servers may also be leased from a central or remote location and accessed via an intermediate network system, such as the Internet. The primary considerations for remote access include the capabilities of the remote access software and the network connection or interface.

Virtualization technology enabled multiple logical servers to operate on a single physical computer. Previously, logical servers were tied directly to physical servers because they relied on the physical server's attributes and resources for their identity. Virtualization technology weakened this restriction by allowing multiple logical servers to override a physical server's attributes and share its resources. Each logical server is operated substantially independent of other logical servers and provides virtual isolation among users effectively partitioning a physical server into multiple logical servers.

A previous disclosure described an ability to completely separate logical servers from particular physical servers so that there was no permanent tie between a physical server and logical resources. Such separation allowed for physical servers to act as a pool of resources supporting logical servers, so that a logical server may be reallocated to a different physical server within a server cloud without users experiencing any change in access approach. The requirement of pre-allocation of physical resources prior to a physical resource change was removed as is required by clustering. It is further desired to provide additional allocation of resources between server clouds. Relationships between server clouds and other entities need to be defined to enable resource sharing and more efficient resource allocation.

SUMMARY OF THE PRESENT INVENTION

The present invention concerns a server cloud manager (SCM) for controlling logical servers and physical resources that comprise a virtualized logical server cloud. The SCM includes multiple core components and one or more interface components. The core components serve as a shared foundation to collectively manage events, validate and authorize server cloud users and agents, enforce predetermined requirements and rules and store operation data. The one or more interface components enable communication with external entities and includes an SCM proxy manager that enables communication with one or more SCMs of other server clouds.

In one embodiment, the core components include an event engine, an authentication engine, a rules engine and a database. The event engine controls and manages events to be performed by the SCM. The authentication engine validates users and agents of the server cloud and issues security credentials to authorized users and agents. The rules engine validates and enforces predetermined requirements and rules to be followed by SCM operations. The database stores information and includes data validation, data formatting and rules validation for the SCM and the server cloud. The events controlled and managed by the event engine may include individual events or collections of events.

The interface components may include a user manager where the core components and the user manager collectively render graphical user interfaces and authorize users of the server cloud according to predetermined roles that define the rights and privileges for each user while accessing server cloud resources. The interface components may include an agent manager that coordinates SCM events with agents within the server cloud that perform specified actions. The interface components may include an administrator manager that renders a user interface, that enables access and control by one or more administrators of the SCM, and that coordinates with core components to authenticate administrative requests. The interface components may include an advanced scripting manager that provides advanced scripting logic and interfaces to other management systems. The interface components may include an SNMP manager that provides an interface between the SCM and an SNMP management application. The interface components may include an image manager that optimizes use of disk resources and files throughout a predetermined domain of the SCM.

The core components may employ a URI mapping as a syntax handle that provides sufficient context information and that describes a management relationship between different components of the SCM. The URI mapping may include an identity aspect that determines an identity of an entity requesting an action to be performed. The URI mapping may include a rights aspect that incorporates predetermined roles assigned to an entity that defines the rights and privileges assigned to the entity. The URI mapping may include a presentation aspect that includes logical relationships that define how information is to be presented. The URI mapping may include an implementation aspect that determines which resources or equipment of a domain of the SCM are effected by actions and commands. The implementation aspect may support server abstraction and/or scripting abstraction. The implementation function may incorporate a proxy function for relaying actions and commands to another server cloud.

A server cloud system according to an embodiment of the present invention includes a first server cloud that includes a first server cloud manager (SCM) and a first logical server and a second server cloud that includes a second SCM. The first and second SCMs are configured to cooperate to manage operation of the first logical server. Such configuration substantially enhances cloud to cloud interaction, operation and cooperation. The first and second SCMs may be configured, for example, to cooperate to move the first logical server from the first server cloud to the second server cloud.

The second server cloud may also include a second logical server, where the first and second SCMs are configured to cooperate to ensure that only one of the first and second logical servers is active at any given time. For example, the first logical server may be activated during a first time period and placed in standby during a second time period, whereas the second logical server is activated during the second time period and placed in standby during the first time period. The first and second SCMs may be configured to cooperate to replicate the first logical server to a second and unique logical server within the second server cloud. The first and second server clouds may have a trust relationship such that the first and second SCMs are peers. The first logical server may be within a subcloud of the first server cloud and the second SCM may have rights over the subcloud.

The server cloud system may include an intermediary that has a trust relationship with the first and second server clouds. In this case, the first and second server clouds may cooperate with each other through the intermediary. The first and second SCMs may be configured to cooperate via the intermediary to move the first logical server from the first server cloud to the second server cloud. The second server cloud may include a second logical server where the first and second SCMs are configured to cooperate via the intermediary to ensure that only one of the first and second logical servers is active at any given time. The server first and second SCMs may be configured to cooperate via the intermediary to replicate the first logical server to a second and unique logical server within the second server cloud.

The second SCM may operate as a proxy for the first logical server so that the first logical server may appear to exist within the second server cloud while actually residing in the first server cloud. If the first server cloud includes a second logical server, the second SCM may operate as a proxy for the first and second logical servers and the first and second SCMs may be configured to cooperate to ensure that only one of the first and second logical servers is active at any given time.

The second server cloud may be an exchange cloud that employs intercloud proxy and commercial terms to enable commercial transactions associated with resources within the first server cloud. The first and second server clouds may establish a commercial relationship for the purpose of enabling the second server cloud to direct use and resell logical server resources in the first server cloud. The server cloud system may further include a third server cloud that has an authorized user and that has a commercial relationship with the exchange cloud. In this case, the authorized user may gain access to the first logical server active in the first server cloud via intercloud proxy via the exchange cloud. The exchange cloud may transfer the first logical server from the first server cloud to the third server cloud for access by an end consumer. The location of the first logical server may be transparent to the end consumer. The transfer of the first logical server may be performed by the exchange cloud transparently to the end consumer.

BRIEF DESCRIPTION OF THE DRAWINGS

A better understanding of the present invention can be obtained when the following detailed description of embodiments of the invention is considered in conjunction with the following drawings, in which:

FIG. 1A illustrates a routing function, FIG. 1B illustrates a switching function, and FIG. 1C illustrates a replication function.

FIG. 2A illustrates the routing function, FIG. 2B illustrates the switching function, and FIG. 2C illustrates the replication function.

FIG. 3A illustrates a routing function, FIG. 3B illustrates a switching function, and FIG. 3C illustrates a replication function.

FIGS. 4A and 4B are figurative block diagrams illustrating user interface with clouds and logical server proxying.

FIGS. 5A-5G are figurative block diagrams of various scenarios that may occur for a customer with growing or changing needs over time illustrating the flexibility of logical server operation, location and accessibility.

DETAILED DESCRIPTION OF EMBODIMENT(S) OF THE INVENTION

Figure 1C:
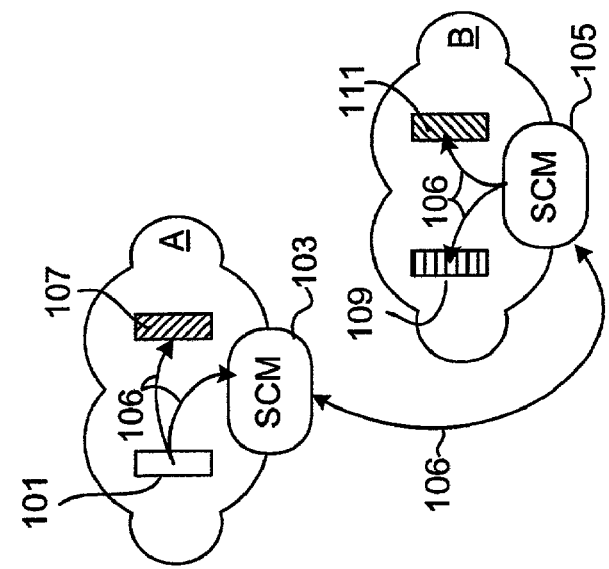
FIGS. 1A-1C are figurative block diagrams illustrating intercloud actions or actions between "trusted" clouds where data can be transferred directly between clouds.

The following definitions are provided for this disclosure with the intent of providing a common lexicon. A "physical" device is a material resource such as a server, network switch, or disk drive. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical network interface card (NIC). A "traditional" device is a combined logical and physical device in which the logical device provides the entire identity of a physical device. For example, a physical NIC has its MAC address permanently affixed so the physical device is inextricably tied to the logical device.

A "virtualized" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet Uniform Resource Locator (URL) instead of a server's MAC address for network identification effectively virtualizes the target server. Complex virtualization separates physical device dependencies from the logical device. For example, a virtualized NIC could have an assigned MAC address that exists independently of the physical resources managing the NIC network traffic.

A "server cloud" or "cloud" is a collection of logical devices which may or may not include underlying physical servers. The essential element of a cloud is that all logical devices in the cloud may be accessed without any knowledge or with limited knowledge of the underlying physical devices within the cloud. Fundamentally, a cloud has persistent logical resources, but is non-deterministic in its use of physical resources. For example, the Internet may be viewed as a cloud because two computers using logical names can reliably communicate even though the physical network is constantly changing.

A "virtualized logical server cloud" refers to a logical server cloud comprising multiple logical servers, where each logical server is linked to one of a bank of physical servers. The boundary of the logical server cloud is defined by the physical resources controlled by a "cloud management infrastructure" or a "server cloud manager" or SCM. The server cloud manager has the authority to allocate physical resources to maintain the logical server cloud; consequently, the logical server cloud does not exceed the scope of physical resources under management control. Specifically, the physical servers controlled by the SCM determine a logical server cloud's boundary. "Agents" are resource managers that act under the direction of the SCM. An agent's authority is limited in scope and it is typically task-specific. For example, a physical server agent (PSA) is defined to have the authority to allocate physical resources to logical servers, but does not have the authority or capability to create administrative accounts on a logical server. An agent generally works to service requests from the server cloud manager and does not instigate actions for itself or on other agents.

A prior disclosure introduced virtualization that enabled complete separation between logical and physical servers so that a logical server may exist independent of a specific physical server. The logical server cloud virtualization added a layer of abstraction and redirection between logical and physical servers. Logical servers were implemented to exist as logical entities that were decoupled from physical server resources that instantiated the logical server. Decoupling meant that the logical attributes of a logical server were non-deterministically allocated to physical resources, thereby effectively creating a cloud of logical servers over one or more physical servers. The prior disclosure described a new deployment architecture which applied theoretical treatment of servers as logical resources in order to create a logical server cloud. Complete logical separation was facilitated by the addition of the SCM, which is an automated multi-server management layer. A fundamental aspect to a logical server cloud is that the user does not have to know or provide any physical server information to access one or more logical server(s), since this information is maintained within the SCM. Each logical server is substantially accessed in the same manner regardless of underlying physical servers. The user experiences no change in access approach even when a logical server is reallocated to a different physical server. Any such reallocation can be completely transparent to the user.

The present disclosure builds upon logical server cloud virtualization by adding a layer of abstraction and redirection between logical servers and the server clouds as managed and controlled by corresponding SCMs. The server cloud is accessed via its SCM by a user via a user interface for accessing logical and physical servers and by the logical and physical servers themselves, such as via logical and/or physical agents as previously described. As further described herein, SCMs may further interface each other according to predetermined relationships or protocols, such as "peer" SCMs or server clouds or between a server cloud and a "super peer", otherwise referred to as an "Exchange". The present disclosure introduces the concept of a "subcloud" in which an SCM interfaces or communicates with one or more logical and/or physical servers of another server cloud. The SCM of the server cloud operates as an intermediary or proxy for enabling communication between a logical server activated within a remote cloud. Logical servers may be moved from one server cloud to another or replicated between clouds. A remote SCM may manage one or more logical servers in a subcloud of a remote server cloud. In fact, a logical server may not be aware that it is in a remote cloud and may "think" that or otherwise behave as though it resides in the same cloud as the SCM managing its operations. The proxy functionality enables transparency between users and logical servers. The user of a logical server may or may not be aware of where the logical server exists or in which server cloud it is instantiated.

Many advantages and capabilities are enabled with cloud to cloud interfacing. Routing, switching, replication and cloud balancing may be performed intercloud, such as between "trusted" clouds, extracloud, such as between "untrusted" clouds, or via an intermediary (e.g., super-peer, supercloud, shared storage, exchange) in which actions requested of one SCM are transparently performed by a different SCM. An exchange cloud may be established that has predetermined commercial relationships with other clouds or that is capable of querying public or otherwise accessible clouds for resource information. Such an exchange cloud may be established on a commercial basis, for example, to provide a free market exchange for servers or services related thereto. Exchange clouds include intercloud proxy and predetermined business rules and relationships to conduct commercial transactions. Such commercial transactions may include, for example, sale or lease of logical servers on the market through a common exchange and medium, such as the Internet.

Figure 1B:
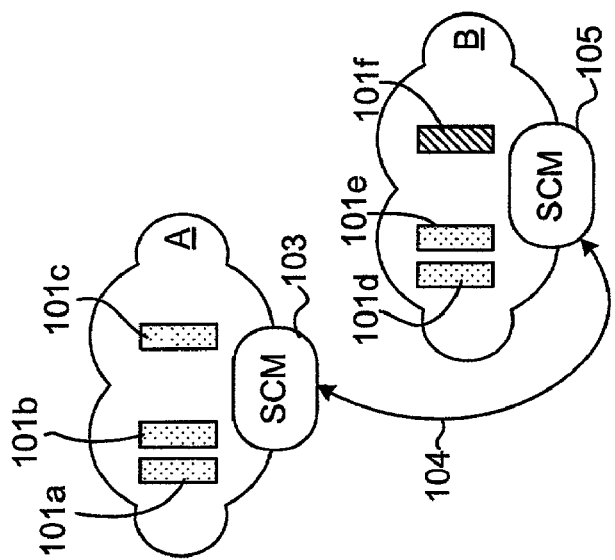
Figure 1A:
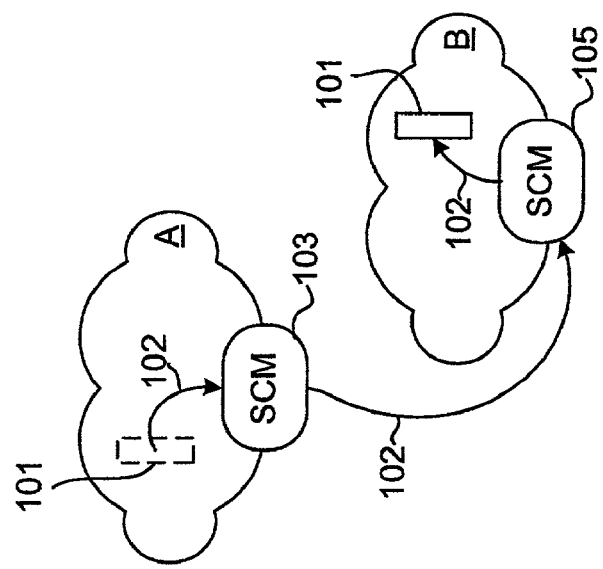

FIGS. 1A-1C are figurative block diagrams illustrating intercloud actions or actions between trusted clouds A and B where data can be transferred directly between clouds. An SCM 103 of cloud A and an SCM 105 of cloud B in each of these cases are considered "peers".

FIG. 1A illustrates the routing function in which only a single instance of a logical server (LS) 101 exists within the boundaries of both clouds A and B. The LS 101 may be active or held in standby. The SCMs 103 and 105 coordinate to move the instance of LS 101 from cloud A to cloud B as illustrated by arrows 102.

FIG. 1B illustrates the switching function in which multiple instances of the LS 101 exist although only one is active at any given time. Cloud A includes LS instances 101a, 101b and 101c while cloud B includes instances 101c, 101d and 101f. The LS 101f is shown with diagonal lines to indicate that it is active in cloud B. The remaining LS instances 101a-101e are in standby as indicated by a shading pattern. The SCMs 103 and 105 coordinate with each other as illustrated by arrow 104 to manage the multiple logical servers 101a-101f to ensure that only one logical server is active at any given time.

FIG. 1C illustrates the replication function in which a logical server LS 101 is replicated from a master template to create a set of similar although unique logical servers 107, 109 and 111. The LS 107 is replicated within the same cloud A whereas the logical servers 109 and 111 are replicated in another cloud B. The logical servers 107, 109 and 111 are shown with different line patterns to illustrate that they are different logical servers even if similar to the original LS 101. The SCMs 103 and 105 coordinate with each other as illustrated by arrow 106 to replicate the LS 101 as a master template into multiple unique logical servers 107-109. For example, the instance information from the LS 101 is passed to the SCM 105 for replicating it within cloud B. The logical servers 101, 107, 109 and 111 may all be activated at the same time since they are different logical servers with unique identities.

Figure 2C:
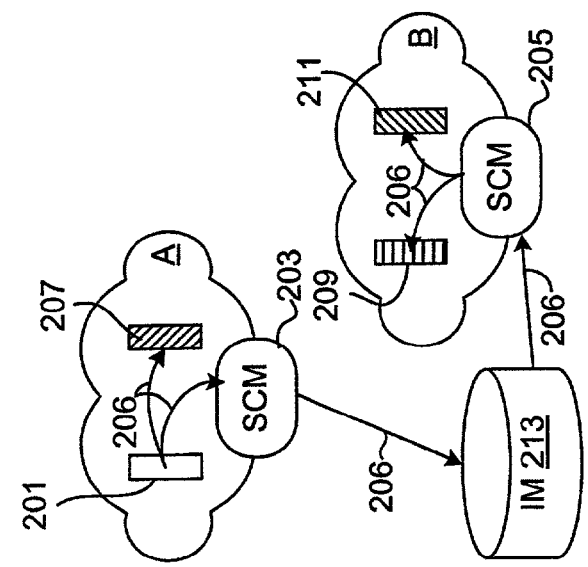
FIGS. 2A-2C are figurative block diagrams illustrating extracloud actions or actions between "untrusted" clouds where data is transferred indirectly between clouds through an intermediary (IM).
Figure 2B:
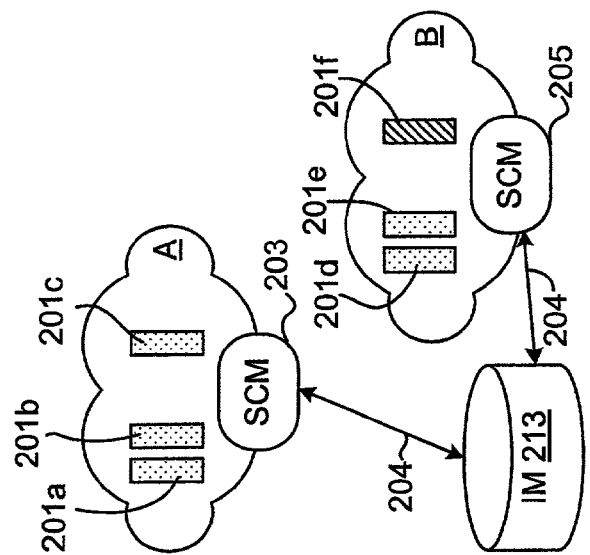
Figure 2A:
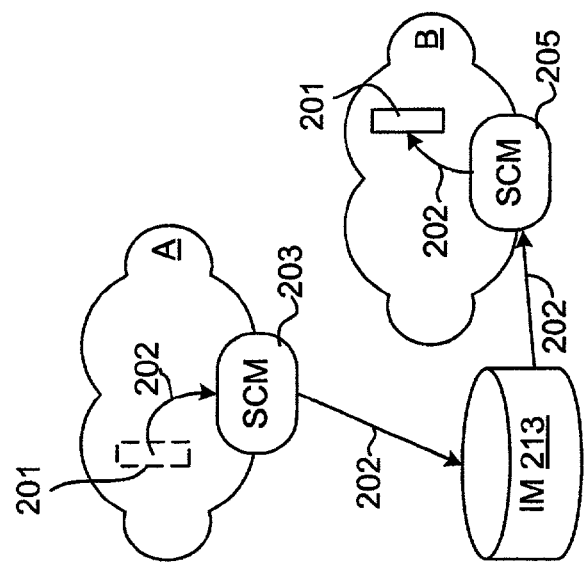

FIGS. 2A-2C are figurative block diagrams illustrating extracloud actions or actions between "untrusted" clouds A and B where data is not transferred directly between clouds. Instead, data and commands are transferred via an intermediary (IM) 213, which may comprise a super-peer, a supercloud, a shared storage or an exchange. In each case, the clouds A and B include SCMs 203 and 205, respectively, which are similar to the SCMs 103 and 105. The routing, switching and replication functions are similar, except that the SCMs 203 and 205 cooperate with the IM 213 to perform the respective extracloud functions.

FIG. 2A illustrates the routing function in which only a single instance of a logical server (LS) 201 exists. Again, the LS 201 may be active or held in standby. The SCMs 203 and 205 coordinate with the IM 213 to move the instance of LS 201 from cloud A to cloud B as illustrated by arrows 202.

FIG. 2B illustrates the switching function in which multiple instances of the LS 201 exist although only one is active at any given time. Cloud A includes LS instances 201*a*, 201*b* and 201*c* while cloud B includes instances 201*c*, 201*d* and 201*f*. The LS 201*f* is shown with diagonal lines to indicating that it is active in cloud B. The remaining LS instances 201*a*-201*e* are in standby as indicated by shading. The SCMs 203 and 205 coordinate with each other via the IM 213 as illustrated by arrows 204 to manage the multiple logical servers 201*a*-201*f* to ensure that only one of the logical servers is active at any given time.

FIG. 2C illustrates the replication function in which a logical server LS 201 is replicated from a master template to create a set of similar although unique logical servers 207, 209 and 211. The LS 207 is replicated within the same cloud A whereas the logical servers 209 and 211 are replicated in another cloud B. The logical servers 207, 209 and 211 are shown with different patterns to illustrate that they are different logical servers even if similar to the original LS 201. The SCMs 203 and 205 coordinate with each other via the IM 213 as illustrated by arrows 206 to replicate the LS 201 as a master template into multiple unique logical servers 207-211. Again, the instance information from the LS 201 is passed to the SCM 205 via the IM 213 for replicating it within cloud B. Also, the logical servers 201, 207, 209 and 211 may all be simultaneously activated since they are different logical servers with unique identities.

Figure 3C:
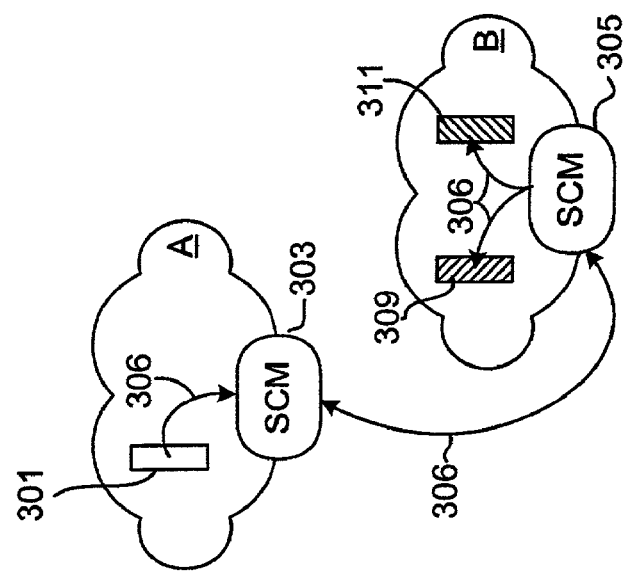
FIGS. 3A-3C are figurative block diagrams illustrating supercloud actions or actions requested of one SCM of a cloud that are transparently performed by a different SCM of another cloud.
Figure 3B:
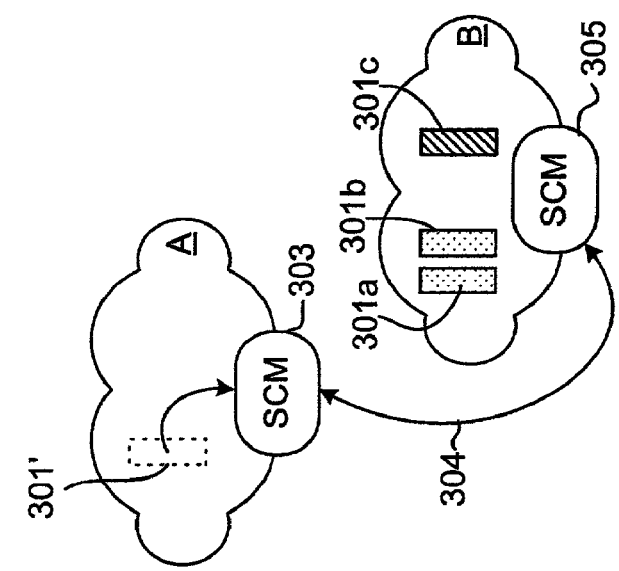
Figure 3A:
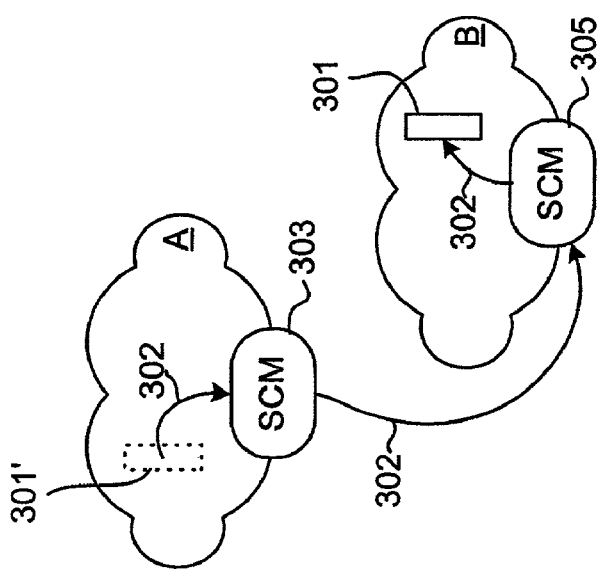

FIGS. 3A-3C are figurative block diagrams illustrating supercloud actions or actions requested of one SCM 303 of cloud A that are explicitly or transparently performed by a different SCM 305 of another cloud B. Cloud A operates as a supercloud with respect to a subcloud of cloud B. In a similar manner as described above, the clouds A and B include SCMs 303 and 305, respectively, which are similar to the SCMs 103 and 105 or 203 and 205. In each case, the SCM 303 acts as a proxy or gateway to the SCM 305 so that the SCM 303 of cloud A appears to own or otherwise control logical servers in the cloud B.

FIG. 3A illustrates the routing function in which only a single instance of a logical server LS 301 exists. In this case, however, the LS 301 resides in the cloud B although it appears to reside in cloud A as shown by LS 301' with dotted lines. As shown by arrows 302, the SCM 303 forwards requests from LS 301' to the SCM 305 and to the LS 301 where the LS 301 is active. The proxy SCM 303 appears to own the LS 301 even though it is active in a different cloud B. The LS 301 may not "know" that it is in cloud B but may "think" or otherwise act as though it is active in cloud A.

FIG. 3B illustrates the switching function in which multiple instances of the LS 301 exist although only one is active at any given time. The LS 301 appears to be active in cloud A as shown as LS 301' with dotted lines, while cloud B includes instances 301*a*, 301*b* and 301*c*. The LS 301*c* is shown with diagonal lines to indicate that it is active in cloud B. The remaining LS instances 301*a* and 301*b* are in standby as indicated by shading. The SCM 303 acts as a gateway for access to the switched LS 301 (LS 301*a*, *b* or *c*) in the cloud B via intermediate paths as shown by arrow 304. The gateway SCM 303 appears to own or otherwise control the active one of the LSs 301*a*-*c* even though active in cloud B. Again, the active one of the LSs 301*a*-*c* may not know that it is in cloud B but may think it is active in cloud A.

FIG. 3C illustrates the replication function in which a logical server LS 301 is replicated from a master template in cloud A to create a set of similar although unique logical servers 309 and 311 in cloud B as shown by arrows 306. In this case, the LS 301 is active in cloud A. The logical servers 309 and 311 are shown with different line patterns to illustrate that they are different logical servers even if similar to the original LS 301. The SCMs 303 and 305 coordinate with each other as illustrated by arrows 306 to replicate the LS 301 as a master template into multiple unique logical servers 309 and 311. The SCM 303 instructs the SCM 305 to replicate the LS 301 in the cloud A as the logical servers 309 and 311 in cloud B.

The function of cloud balancing may be performed within any of the intercloud, extracloud or supercloud architectures and facilitated by the routing, switching or replication functions. For the routing function as applied to the intercloud, extracloud or supercloud configurations, the LS 101 is moved from one physical server (PS) to another with more capacity or with greater resources or simply in a different geographic area or time zone. In the supercloud case, the commands are proxied to a different instance of the logical server in another cloud, where the different instances may have different capacity or be located in a different geographic area or time zone. For the switching function, the SCMs of the clouds A and B coordinate (either directly or via the IM 213) to select the instance of the LS with the appropriate capacity or resource level based on demands or needs. For the replication function, the SCM creates additional LS instances with variant capacities or in different areas or times and replaces one LS instance with another in order to allocate more capacity within a cloud or across clouds.

FIGS. 4A and 4B are figurative block diagrams illustrating user interface with clouds and logical server proxying. As shown in FIG. 4A, a user (U) 401 attempts to access a logical server LS1 403 via cloud A. As described further below, the user 401 provides a pathname indicative of cloud A and the logical server LS1 403, such as, for example, a pathname including "CLOUDA . . . LS1!ACTION", where "CLOUDA" references cloud A, "LS1" references the logical server LS1 403, and "ACTION" denotes a particular action or operation to perform, such as login, reboot, etc. Although the logical server LS1 403 appears to be active in cloud A to the user 401, the logical server LS1 403 is actually active in cloud B. As described above, the SCM (not shown) of cloud A serves as a proxy to forward data and commands from cloud A to the SCM of cloud B, which forwards the data and commands to the LS1 403 active in cloud B. Such proxy scenario may be completely transparent to the user 401, such that the user thinks or believes that LS1 403 resides in cloud A. Also, the logical server LS1 403 may behave in a manner that indicates that it is active in cloud A when in fact it is active in cloud B.

Many rationales exist for activating the logical server LS1 in a different cloud than its home cloud or its apparent cloud of residence. Cloud A may lack the necessary resources to build or operate the logical server LS1, so that it is moved or replicated and operated in cloud B and proxied via cloud A. For example, the underlying physical resources of cloud A, including its physical servers, may have experienced a temporary failure or shutdown or the like, which would otherwise render the logical server LS1 inoperable or unavailable. Instead, logical server LS1 is available in cloud B via proxy. Or, the resources of cloud A may be temporarily over-subscribed or subscribed at or near its full capacity, so that the logical server LS1 is temporarily moved to cloud B to prevent interruption in service or to maintain desired level of service. Or, the user 401 may have requested additional capacity or capabilities that were not available at the time in cloud A, so that the expanded capacity LS1 is temporarily or permanently active in cloud B. Such proxy may be on a permanent or temporary basis depending upon the situation or the needs of the user 401. Regardless of the particular reason or scenario, it is understood that the present invention provides the ability to move and operate logical servers in any server cloud of choice.

FIG. 4B is a figurative block diagram similar to FIG. 4A except that the logical server LS1 is active in cloud A and a copy of the logical server LS1 is maintained in cloud B. As illustrated by dashed line 405, LS1 is active in either cloud A or B at any given time, although preferably not in both to avoid ambiguity or malfunction. The cloud A can command activation of LS1 in either cloud A or B and re-direct data and commands as needed. In one embodiment, the user 401 accesses the logical server LS1 via cloud A regardless of where it is activated, and may not even be aware that the backup of LS1 exists in a different cloud. Alternatively, as illustrated by dashed line 407, the user 401 may not only be aware of the backup copy of LS1 in cloud B, but may in fact control the switching of activation of LS1 between the clouds A and B. In this manner, the user 401 may load balance or cluster servers as desired.

FIGS. 5A-5G are figurative block diagrams of various scenarios that may occur for a customer (CS) 501 with growing or changing needs over time illustrating the flexibility of logical server operation, location and accessibility. At the start, CS 501 may have need of one or more servers but may not desire or have the resources to purchase physical servers. As shown in FIG. 5A, CS 501 decides to rent or purchase one or more logical servers 503 from the owner of a server cloud A. CS 501 accesses the logical servers 503 remotely across suitable networks as shown by arrow 502.

As its needs grow, CS 501 chooses to acquire the use of one or more additional logical servers 505 from the owner of another cloud B as shown in FIG. 5B. There may be various reasons for using the servers of another cloud, such as price, capability or capacity considerations. Since the logical servers 505 are in a different cloud, a separate path or link to the cloud B is necessary as shown by arrow 504.

Eventually, CS 501 determines to co-manage all of the logical servers 503 and 505 from a single cloud, such as via cloud A as shown in FIG. 5C. CS 501 may decide, for example, to treat all of the logical servers 503, 505 as one larger pool of servers to avoid separate accesses 502, 504 or to simplify addressing. In this case, CS 501 accesses all of the logical servers 503, 505 in both clouds A and B via the SCM of cloud A through one link as shown by arrow 507. Also, a subcloud link shown by arrow 509 is established between clouds A and B, so that the logical servers 505 are managed by the SCM of cloud A. In effect, the logical servers 505 are part of a subcloud of cloud A that exists in cloud B.

CS 501 eventually decides to self-manage its logical servers 503, 505 and creates a local server cloud 511 as shown in FIGS. 5D and 5E. The server cloud 511 need not include any logical servers and needs only have sufficient physical resources to access and manage logical servers within other clouds. The logical servers 503 and 505 are still active in the clouds A and B, respectively. As shown in FIG. 5D, the server cloud 511 includes an SCM 513 that access the server clouds A and B via separate links as shown by arrows 515 and 517. Such configuration may be a logical extension of the configuration of FIG. 5B in which the clouds A and B are accessed via separate links, except that the configuration of FIG. 5D is more convenient since all of the logical servers 503, 505 may be locally managed by CS 501 via its local server cloud 511. In effect, the cloud 511 has access to subclouds of clouds A and B. Alternatively as shown in FIG. 5E, a single link from cloud 511 to cloud A is established as illustrated by arrow 519. The subcloud link 509 between the clouds A and B is used so that cloud A has subcloud rights to the logical servers 505 active in cloud B. Such configuration may be a logical extension of the configuration of FIG. 5C in which the clouds A and B are accessed via a single link, except that the configuration of FIG. 5E is more convenient since all of the logical servers 503, 505 are locally managed by CS 501 via its local server cloud 511. In effect, the cloud 511 has access to a subcloud of cloud A, and cloud A has access to a subcloud of cloud B. CS 501 still has sufficient access to all of its logical servers 503, 505.

As CS 501 continues to grow, it may decide to acquire local physical assets and activate one or more local logical servers 521 within cloud 511 as shown in FIG. 5F. Even though separate arrows 523 are shown from cloud 511 to clouds A and B, either of the configurations of FIG. 5D or 5E may be implemented so that CS 501 locally manages all of the logical servers 503, 505 and 521 via its local server cloud 511. CS 501 may choose to add physical resources and consolidate some of its logical servers into its local cloud 511. As shown in FIG. 5G, for example, the logical servers 505 are moved from cloud B into the local cloud 511. In this case, links and relationships with cloud B are no longer necessary and may be terminated. The logical servers 505 may effectively be the same in capacity regardless of the cloud in which they are activated, so that the underlying cloud is transparent. The persistent attributes are configured to be the same. Thus, users of the logical servers 505 may not be aware that the logical servers 505 have moved into a different cloud. The cloud 511 still has access to a subcloud of cloud A containing the logical servers 503 as shown by arrow 519.

Figure 6:
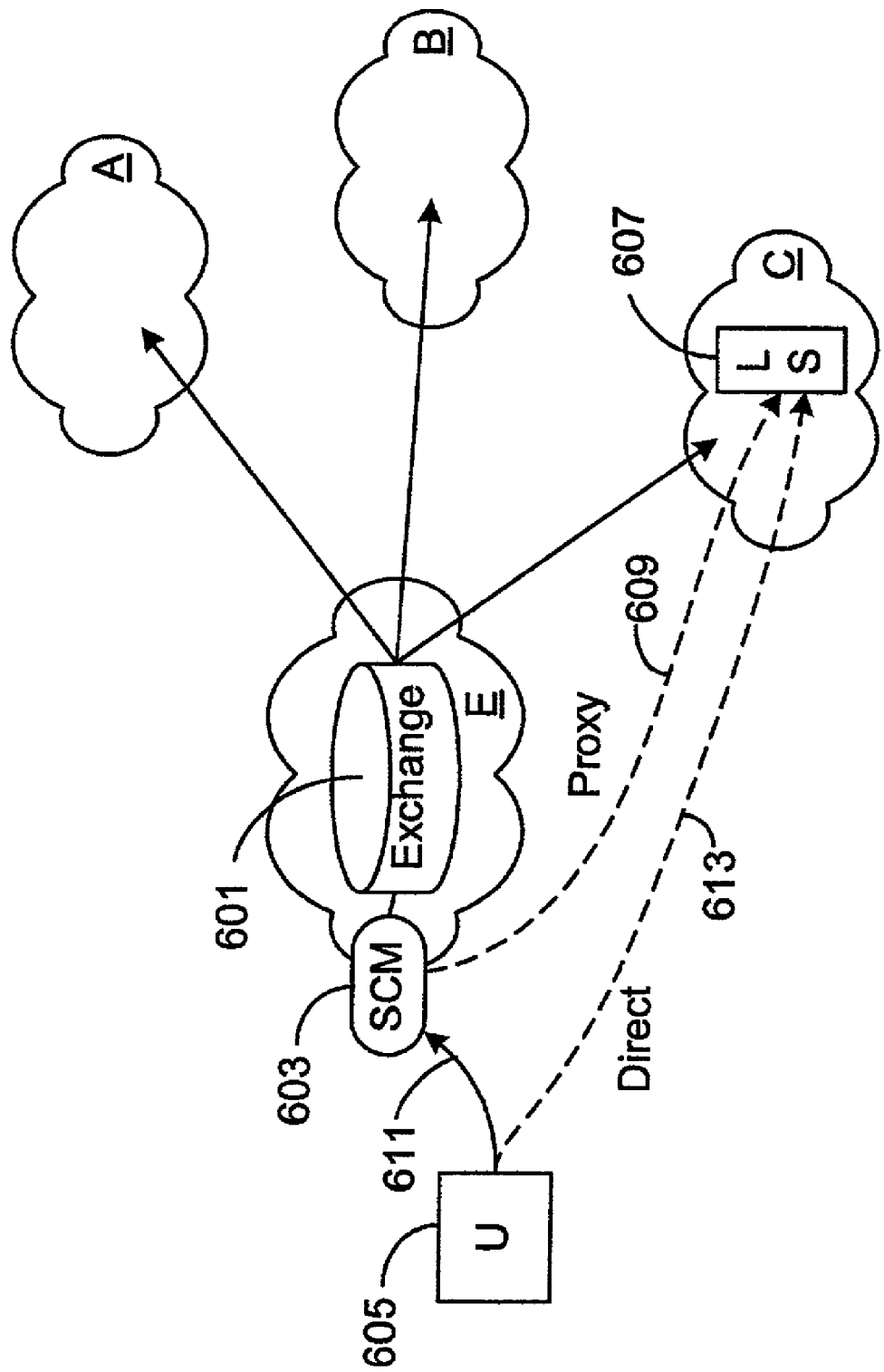
FIG. 6 is a figurative block diagram illustrating operation of an exchange cloud as an intermediary according to an embodiment of the present invention.

FIG. 6 is a figurative block diagram illustrating operation of an exchange cloud E as intermediary according to an embodiment of the present invention. An exchange cloud may be implemented in a similar manner as any server cloud, such as including an SCM 603 or the like, but does not necessarily have to include any logical servers and may include relatively minimal physical resources and/or physical servers. The exchange cloud E includes an exchange database 601 or the like that stores information associated with one or more other public or otherwise accessible clouds A, B, C, etc. The clouds A-C may have, for example, predetermined relationships with the exchange cloud E as defined by parameters contained within the exchange database 601, which also includes access information for those clouds.

An exemplary commercial use of the exchange cloud E may be the ability for potential users to search for and use logical servers in the other clouds A-C that meet the user's needs or requirements. For example, a user 605 contacts the exchange cloud E via link arrow 611 with a set of parameters or criterion for purposes of finding one or more logical servers that meet its requirements at the lowest price. The exchange cloud E forwards the requirements parameters to the other clouds A-C, or otherwise searches its exchange database 601 to find as many servers as possible that meet the needs of the user 605. The exchange cloud E either selects logical servers from one of the clouds A-C or the clouds A-C may bid against each other to win a contract with the user 605. The inverse situation is contemplated in which multiple users may bid for access privileges of a server cloud. Another exemplary embodiment is the exchange cloud E operating as a central manager or the like for allocating resources distributed among multiple clouds A-C for a plurality of users. The user 605 requests one or more logical servers from the exchange cloud E, which locates one or more suitable logical servers and provides access to the user 605.

As shown, the exchange cloud E identifies a logical server 607 located in cloud C in response to a request by the user 605. The SCM 603 may act as proxy or intermediary for providing access of the logical server 607 to the user 605, such as shown by dashed arrow 609. In such case, the user 605 maintains a relationship with the exchange cloud E as indicated by arrow 611 through which it accesses the logical server 607 located in cloud C. Alternatively, the SCM 603 forwards access or other credential information to the user 605, which uses the access information to directly access the logical server 607 via the cloud C as illustrated by dashed arrow 613. As described further below, the user 605 may not have any rights within the cloud C, but may inherit rights otherwise granted to the SCM 603 for the exchange cloud E.

Figure 7:
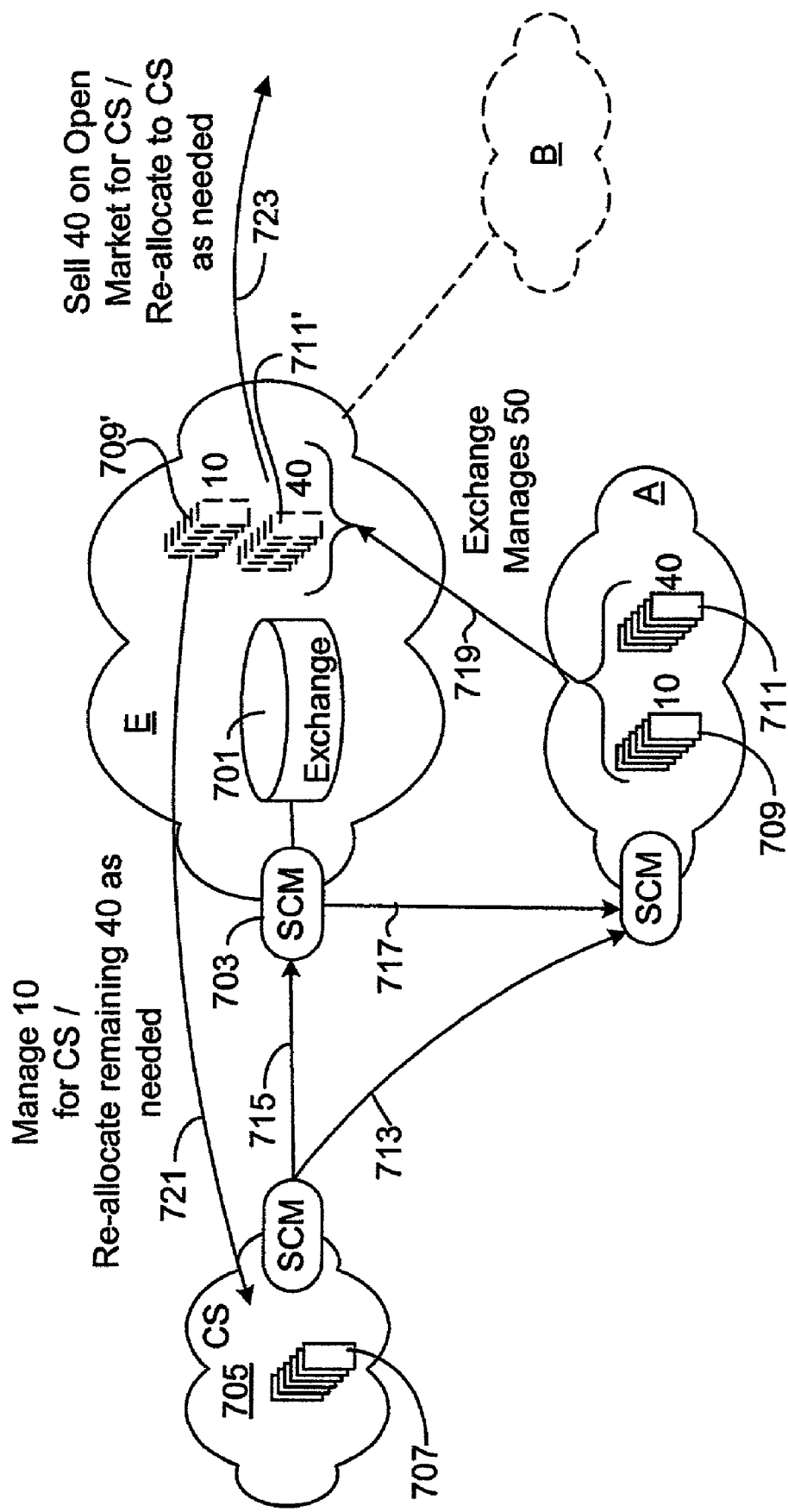
FIG. 7 is a figurative block diagram illustrating logical server management by an exchange cloud according to an embodiment of the present invention.

FIG. 7 is a figurative block diagram illustrating logical server management by an exchange cloud E according to an embodiment of the present invention. The exchange cloud E includes an exchange database 701 and an SCM 703. A customer (CS) cloud 705 includes a plurality of local servers 707 which it manages locally. The customer CS deems that it requires additional logical servers and accesses the exchange cloud E for additional servers via link arrow 715. For example, the customer CS may have immediate needs for 10 additional servers and may anticipate a need for more servers in the future. The exchange cloud E identifies a cloud A that has sufficient server capacity to meet the immediate and future needs of the customer CS. In particular, the cloud A includes 10 logical servers 709 and has at least 40 additional servers 711 to meet the future needs of the customer CS. The customer CS has the option of purchasing or leasing only the 10 logical servers 709 and delaying acquisition of additional servers. However, the cloud A may be able to provide a group of 50 logical servers at a bulk price so that each of the 50 servers are available at reduced cost.

The customer CS decides to acquire (rent or purchase) 50 logical servers from cloud A, including the 10 logical servers 709 for meeting it's immediate needs and 40 additional logical servers 711 for meeting it's future needs. The customer CS may choose, if the option is available, to manage the logical servers 709, 711 from the cloud A as shown by arrow 713. Alternatively, the customer CS passes to the exchange cloud E the credentials for accessing the logical servers 709, 711 as shown by arrows 715 and 717. In this manner, the SCM 703 of the exchange cloud E operates a proxy for accessing the logical servers 709, 711 in cloud A on behalf of the customer CS as shown by arrow 719. The logical servers 709 and 711 appear to be located in the exchange cloud E as shown at 709' and 711', respectively. Since the customer CS has immediate need of only 10 logical servers, it assumes control of the logical servers 709 via the exchange cloud E as indicated by arrow 721. The customer CS accesses the logical servers 709 via the SCM 703, and the SCM 703 proxies the logical servers 709 so that they appear to be within the cloud E as shown as 709'.

One advantage of the exchange cloud E is that the logical servers 711 may be temporarily sold on the open market as indicated by arrow 723. In this manner, the customer CS assumes control of the logical servers 709 and sells the remaining logical servers 711 to third parties via the exchange cloud E. This may provide a significant savings to the customer CS in that most, if not all, of its cost in the logical servers 711 may be retrieved via third party rental (minus any management fees charged by the owners of the exchange cloud E). As the needs of the customer CS grows over time, it may request that some or all of the logical servers 711 be re-allocated to the customer CS as necessary. The exchange cloud E may move one or more of the logical servers 709, 711 to a different cloud, such as another cloud B if desired. For example, the logical servers 711 may be moved to cloud B while not needed by the customer CS and while being rented by third parties, if desired. In this manner, the present invention provides complete flexibility for managing logical servers between clouds.

Figure 8:
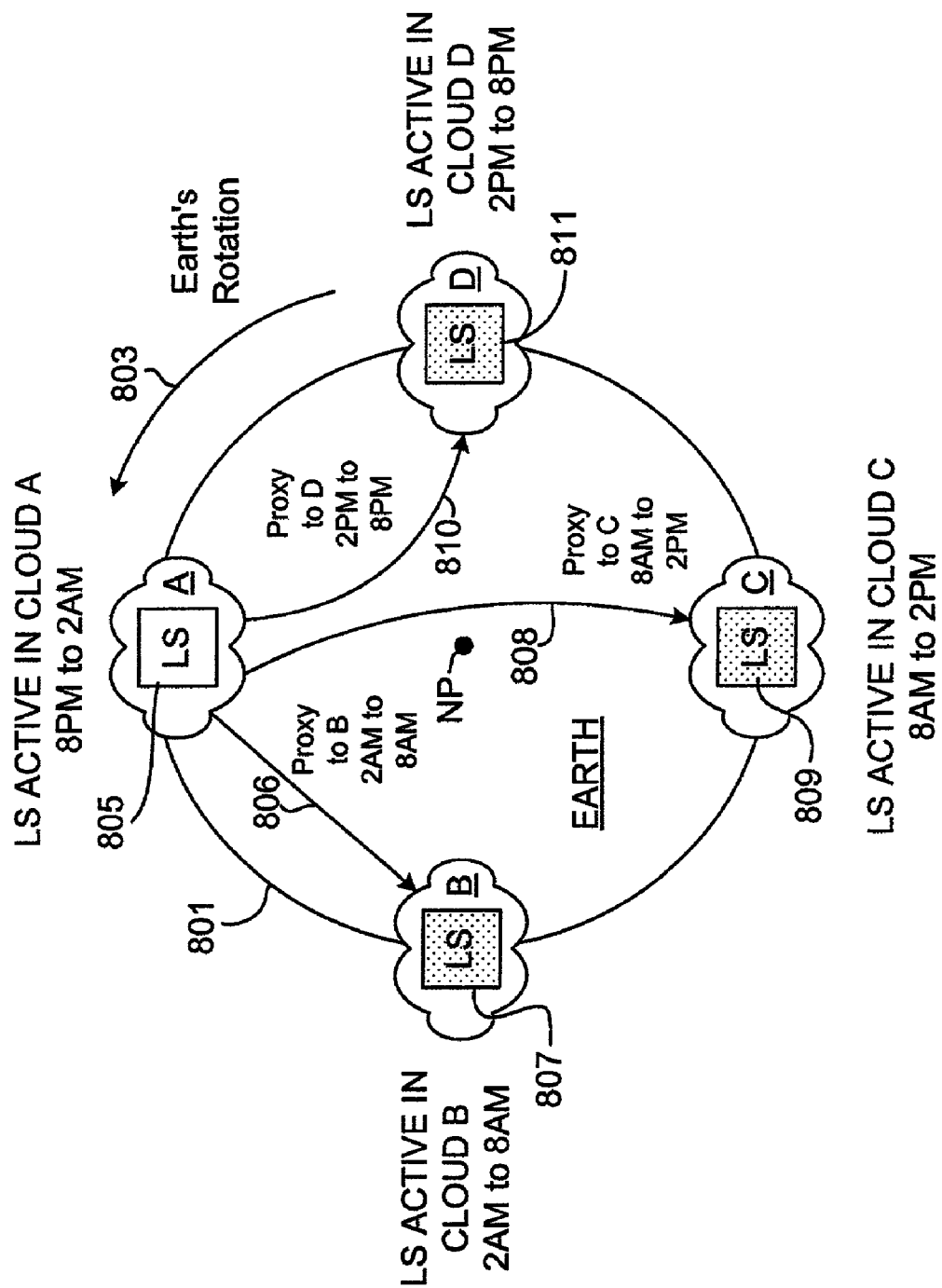
FIG. 8 is a figurative block diagram illustrating load shifting of a logical server across geographic areas employing the proxy functionality.

FIG. 8 is a figurative block diagram illustrating load shifting of a logical server across geographic areas employing the proxy functionality. The Earth 801 is shown in perspective as though viewed from a distance looking directly at the North Pole (NP). Four separate server clouds A, B, C and D are distributed around the Earth 801, generally divided by its "four corners" or separated by equivalent quadrants such as by 8 hour time periods of the total 24-hour period defined by it's the Earth's rotation as indicated by an arrow 803. A logical server (LS) is active from 8PM to 2AM in cloud A as shown at 805, where all times are referenced with respect to the physical location of cloud A. Other instances of the logical server LS exist in each of the other clouds B, C and D as shown at 807, 809 and 811, respectively, each in standby mode while active in cloud A.

At time 2AM, the logical server LS is proxied from cloud A to cloud B for the next 8 hour time period 2AM to 8AM as indicated by arrow 806. The LS 805 in cloud A is placed in standby mode while the instance of LS 807 in cloud B is activated. Users attempting to access LS 805 in cloud A are simply proxied to the activated LS 807 in cloud B. At time 8AM, the logical server is proxied from cloud A to cloud C for the next 8 hour time period 8AM to 2PM as indicated by arrow 808. The LS 807 in cloud B is placed back in standby mode while the instance of the LS 809 in cloud C is activated. The LS 805 in cloud A remains in standby and cloud A proxies data and information to cloud C. At time 2PM, the logical server is proxied from cloud A to cloud D for the next 8 hour time period 2PM to 8PM as indicated by arrow 810. As before, the LS 809 in cloud C is placed in standby mode while the instance of the LS 811 in cloud D is activated. The logical server instances in clouds A-C remain in standby and cloud A proxies data and information to cloud D. At time 8PM, the LS 805 is activated once again in cloud A for the next 8 hour time period 8PM to 2AM while the instances of the logical server LS in clouds B-D are once again placed in standby. Operation proceeds in this manner for as long as desired.

The ability to sequentially proxy the activation of a logical server from one cloud to another over time provides many useful benefits and advantages. It may be desired, for example, to activate a web server in a local geographic area during peak load or access in that area to best serve the needs of users across the globe over time. Alternatively, the local area resources may be needed during peak hours for local access so that one or more servers providing other needs, such as heavy computational operations or the like, may be offloaded to servers in a different geographic area during off-hours in that area. In this manner, the physical resources supporting the logical servers may be employed in the most efficient manner with the ability to shift loads to available resources at any chosen time.

Figure 9:
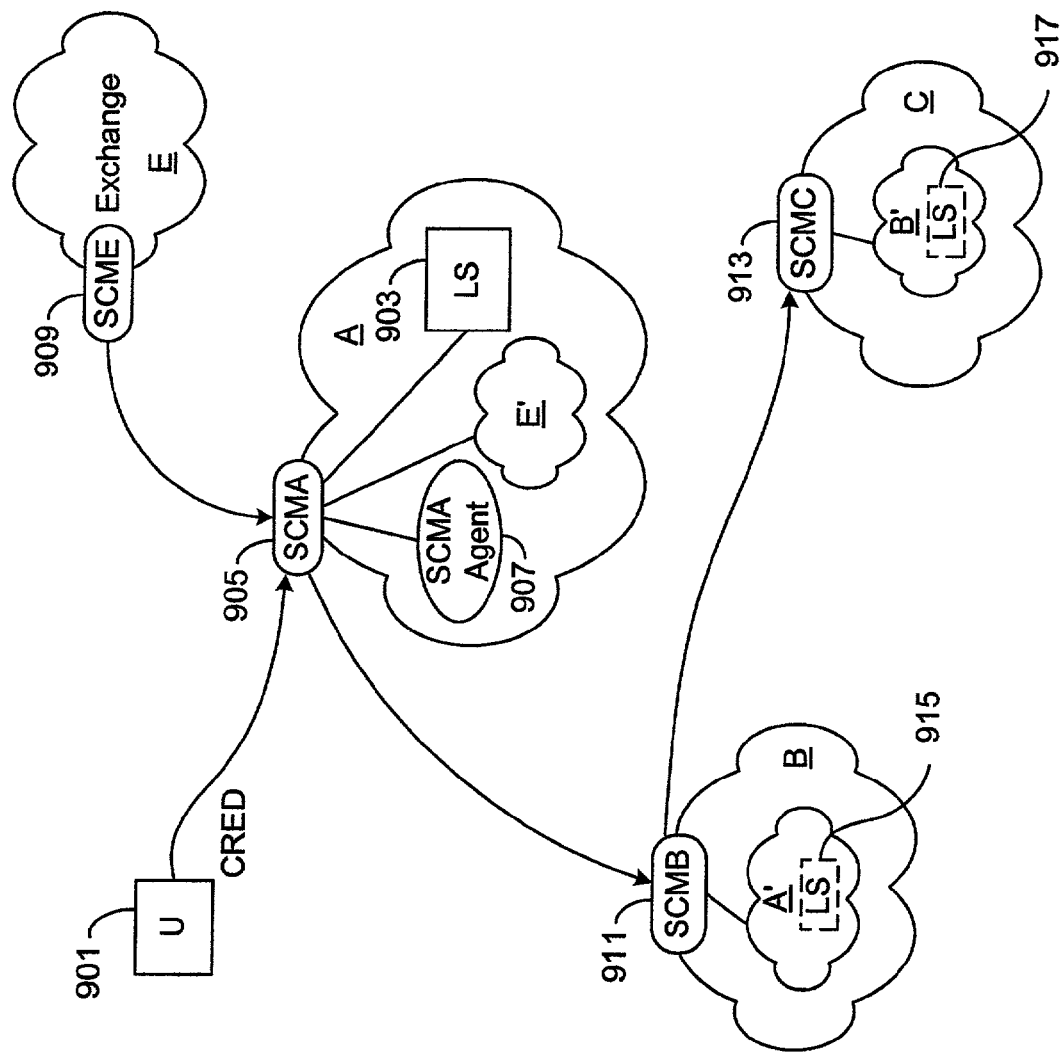
FIG. 9 is a figurative block diagram illustrating various trust relationships with an SCM of a server cloud and between server clouds.

FIG. 9 is a figurative block diagram illustrating various trust relationships with the SCM of a server cloud and between server clouds. A user 901 of a logical server 903 of a server cloud A has a "credentialed" (CRED) trust relationship with the cloud A or its SCM, shown as SCMA 905. A credentialed trust relationship is a form of "explicit" trust relationship in which "rights" or "privileges" provided to, and/or actions allowed by, the user 901 are predetermined, clearly defined, and usually "limited" or otherwise "restricted" by a contract or agreement. A non-exhaustive list of "rights" within a cloud relative to logical servers include "add", "delete", "move", "replicate", "reset", "reboot", "build", "store", "snapshot", among others. The agreement is an expression of boundaries of rights and privileges, such as limited number or types of rights and/or limits on particular rights. A credentialed trust relationship may be "transitory" in that it has a predefined duration or expiration date according to the agreement. The user 901 identifies itself to the SCMA 905 with predetermined credentials, such as a username and password or the like, which invokes the user's access to the cloud A according to the credentialed trust relationship. The rights of the user 901 may be limited to the LS 903 may include one or more other logical servers within the cloud A.

An agent of SCMA 905, shown as SCMA Agent 907, is an internal "implicit" component of the server cloud A having implicit rights. Implicit rights are generally "unlimited" in that the SCMA Agent 907 has complete control over all logical and physical servers active within the server cloud A via the SCMA 905. SCM agents are employed to perform actions on servers within a cloud, where such actions are delayed or triggered or invoked by a combination of both. It is appreciated that an SCM agent generally has all of the rights of the SCM itself, and that may be further determined by event or timing controls. A delayed action may occur after a predetermined time period or a predefined time and a triggered action is invoked upon detection of an event that causes the action to be queued. An action may be invoked after a delay or at a particular time if and when an event is detected. For example, a logical server may be rebuilt upon logoff or after expiration of a time period. Examples of actions or "atomic" actions include "get status", "send email", "reset", "reboot", "change CD ROM", "rebuild image", "snapshot", "restore snapshot", "file copy", "file delete", "file move", "resynch passwords" "start sequence", "runscript", among others. A script may be executed, which is a sequence of atomic actions. The preceding list is exemplary only and not intended to be exhaustive.

The LS 903 within the server cloud A has implicit rights within cloud A although the implicit rights are "restricted" to itself. The LS 903 may request additional resources from SCMA 905 for purposes of cloud balancing, for example, to match resource demands or loads. The LS 903 may perform a switching function and request a "sister" logical server or the like for the purposes of spreading existing or anticipated loads. The LS 903 may perform other actions, such as snapshot or reset or the like as necessary or desired. The LS 903 may also request to be moved to a different cloud or the SCMA 905 may move the LS 903 to a different cloud in an explicit or transparent manner.

Another server cloud, such as an exchange cloud E with manager SCME 909, may be have "subcloud" rights within the server cloud A as illustrated by subcloud E'. A non-exclusive and exemplary list of subcloud rights include "Add", "Maintain", "Move", "Delete", "Replicate", "Proxy", etc. Subcloud rights are explicit "permission" rights within another cloud and include "existence" permission rights over a subset of a cloud and separate "expansion" permission rights that allow expansion or contraction of the subset to add or subtract logical servers. The existence permission rights precede the expansion permission rights and may include an entire server cloud or may include none of the cloud with expansion permission rights to increase the subcloud size to include one or more logical servers.

Additional subcloud relationships may be defined. For example, the cloud A may have subcloud rights over another cloud B via SCMB 911, as illustrated by a subcloud A' within the server cloud B. Further, the cloud B may have subcloud rights over another cloud C via SCMC 913, as illustrated by a subcloud B' within the server cloud C controlled by SCMC 913. In this manner, cloud A has explicit subcloud rights over subcloud A' within cloud B, which further has explicit subcloud rights over subcloud B' within cloud C. It is noted that cloud A may have "implied" rights over subcloud B' within cloud C based on the existing trust relationships. Since cloud B has rights over subcloud B' within cloud C, cloud B may proxy an LS from cloud B to cloud C within subcloud B'. Cloud A may move LS 903 to subcloud A' as shown at 915, and cloud B may move and proxy the already proxied LS 903 to subcloud B' as shown at 917, so that cloud A has implied rights over subcloud B' at least with respect to the proxied LS 903. The LS 903 may request to be moved to cloud B. While in cloud B (or subcloud A'), the LS 903 (915) does not have implicit trust or rights within cloud B, but nonetheless "inherits" explicit rights within cloud B according to the explicit rights between clouds A and B.

Figure 10:
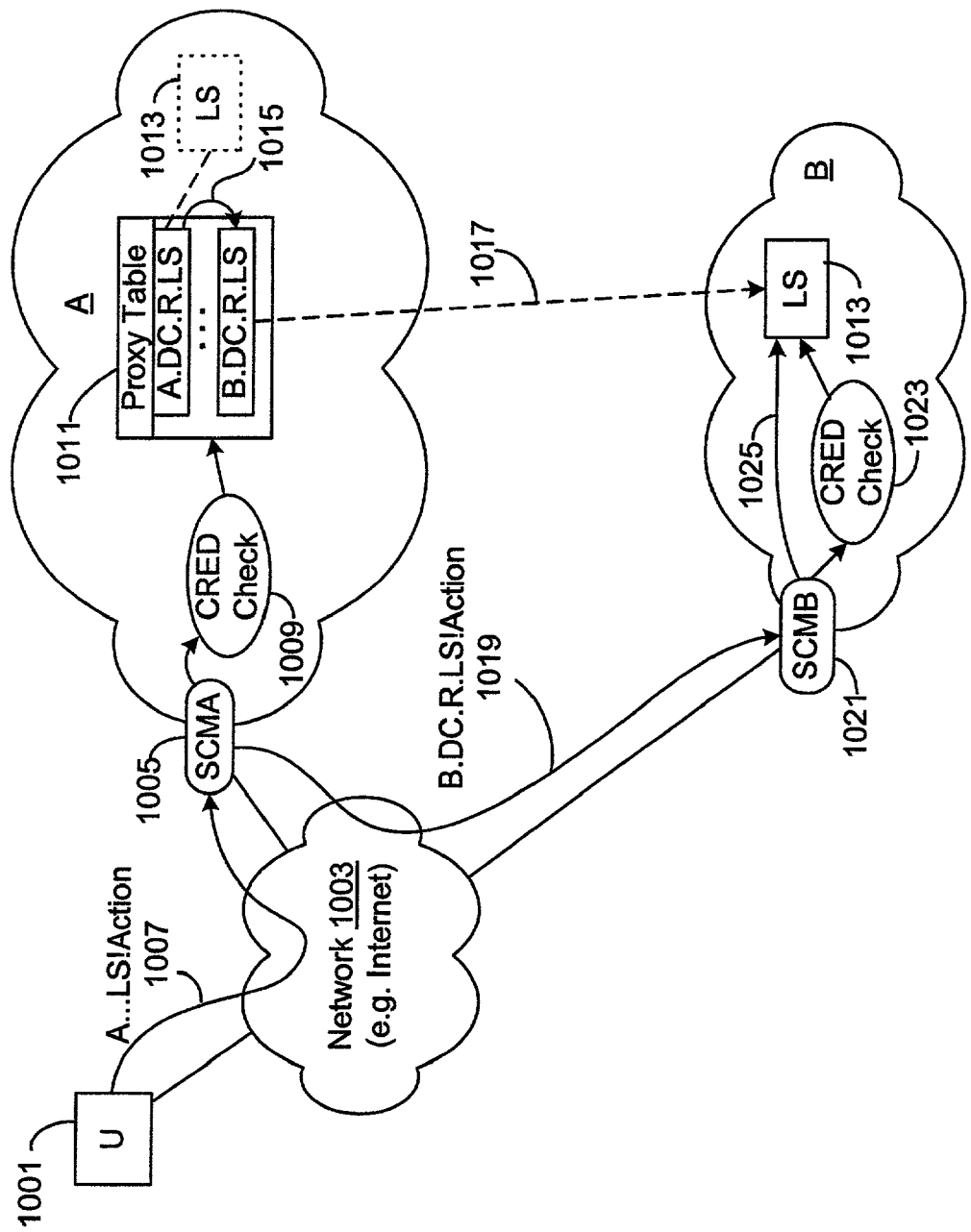
FIG. 10 is a figurative block diagram illustrating an example of proxy syntax for proxying a logical server associated with a user from one server cloud to another server cloud.

FIG. 10 is a figurative block diagram illustrating an example of proxy syntax for proxying a logical server LS 1013 associated with a user 1001 from one server cloud A to another server cloud B. The user 1001 accesses the LS 1013 via cloud A and may believe that the LS 1013 is activated within cloud A when in fact it is activated within cloud B as shown. The server clouds A and B include server cloud managers SCMA 1005 and SCMB 1021, respectively. The user 1001 and the cloud managers SCMA 1005 and SCMB 1021 are interfaced with each other via a network 1003, which may be a global computer network such as the Internet, although any type of intermediate network is contemplated. The user 1001 attempts to access the LS 1013 in cloud A using a Uniform Resource Identifier (URI) or the like incorporating an address that defines a route to the LS 1013 in cloud A. The user 1001 employs a Uniform Resource Locator (URL) within the URI that identifies the target server cloud A. For example, the user 1001 may enter a URI address having syntax "A.DC.R.LS!ACTION", in which "A" is a cloud URL or cloud Internet Protocol (IP) address or cloud name for cloud A, "DC" denotes a particular data center within cloud A, "R" denotes a particular rack of servers of the data center DC, "LS" is the logical server name for LS 1013, the exclamation point "!" is a separator and "ACTION" denotes a particular action to be performed by the LS 1013, such as "login" or the like. It is noted that the data center DC and rack R information are navigation aids or specific path information employed for a particular configuration and need not be provided to uniquely access the LS 1013. Instead, the user 1001 may enter a short-hand version "A . . . LS!ACTION" to uniquely identify the target logical server LS 1013. The omitted path information is filled in by the SCMA 1005. It is noted that alternative syntax formats are contemplated, such as, for example, "LS1@cloudA" that identifies a logical server LS1 located at or otherwise referenced via cloud A. As previously described, LS1 may be accessed via cloud A by proxy if is not currently located within cloud A.

The address "A . . . LS!ACTION" provided by the user 1001 is received by the SCMA 1005 of the server cloud A. Assuming that the user 1001 is not currently logged into the LS 1013, the SCMA 1005 employs a credential (CRED) check 1009 to authenticate the user 1001 to determine if it has rights to access LS 1013. Although shown as a separate function, the credential check 1009 may be incorporated within the SCMA 1005 depending upon the particular configuration. If the user's credential information, such as username and password, is not already incorporated in the address, then the SCMA 1005 prompts the user to provide the credential information. In one embodiment, the SCMA 1005 uses the credential information supplied by the user 1001 to determine the identity of the user and the associated level of rights and privileges provided to the identified user. If the credential information is incorrect or otherwise not recognized by the SCMA 1005, then the attempted command or login is rejected. Otherwise, the SCMA 1005 passes back a temporary token or the like that is used by the user 1001 for subsequent actions or commands during the current session. The supplied token is used to identify the user 1001 during the current session and to associate that user with their level of authority, rights, and/or level of access.

Upon login by the user 1001, the SCMA 1005 accesses a proxy table 1011 or the like for accessing the LS 1013 on behalf of the user 1001. In the case illustrated, the proxy table 1011 includes the a proxy link illustrated by arrow 1015 to an alternative address "B.DC.R.LS" to the LS 1013 activated within cloud B, where "B" denotes a cloud URL or the like addressing the server cloud B. The alternative path "B.DC.R.LS" includes the necessary path information to locate the LS 1013 within cloud B as illustrated by dashed arrow 1017. In this case, the server cloud A has subcloud rights for accessing the LS 1013 activated in cloud B. The SCMA 1005 employs the alternative address including the desired command provided from the authenticated user 1001 to access the LS 1013 in the server cloud B via the SCMB 1021 as illustrated by arrows 1019 and 1025. It is appreciated that the SCMA 1005 accesses the SCMB 1021 of the server cloud B via the intermediate network 1003. Although the SCMB 1021 may employ a credential check 1023 that functions in a similar as the credential check 1009, the SCMA 1005 is recognized or otherwise provides sufficient authentication or credential information to enable access to the LS 1013 within the server cloud B as indicated by arrow 1025. The user 1001 is provided access to the LS 1013 within the server cloud B via the SCMA 1005 and SCMB 1021 for subsequent commands and actions.

In the embodiment shown, the user 1001 continues to access the LS 1013 via the SCMA 1005 employing a proxied relationship to the server cloud B. It is noted that the user 1001 may not have any implicit or explicit rights within the server cloud B. Thus, if the user 1001 attempts to provide the address "B.DC.R.LS" directly to the server cloud B using the same credentials for accessing cloud A, the SCMB 1021 may reject the access as not recognized by the credential check 1023. The user 1001 needs explicit rights and corresponding valid credentials to directly access cloud B. Even so, access to logical servers within cloud B does not necessarily mean that the user 1001 is able to access LS 1013 since within a subcloud of cloud A. The user 1001 indirectly inherits the rights of the SCMA 1005 within the server cloud B as long as the access is through the SCMA 1005.

Figure 11:
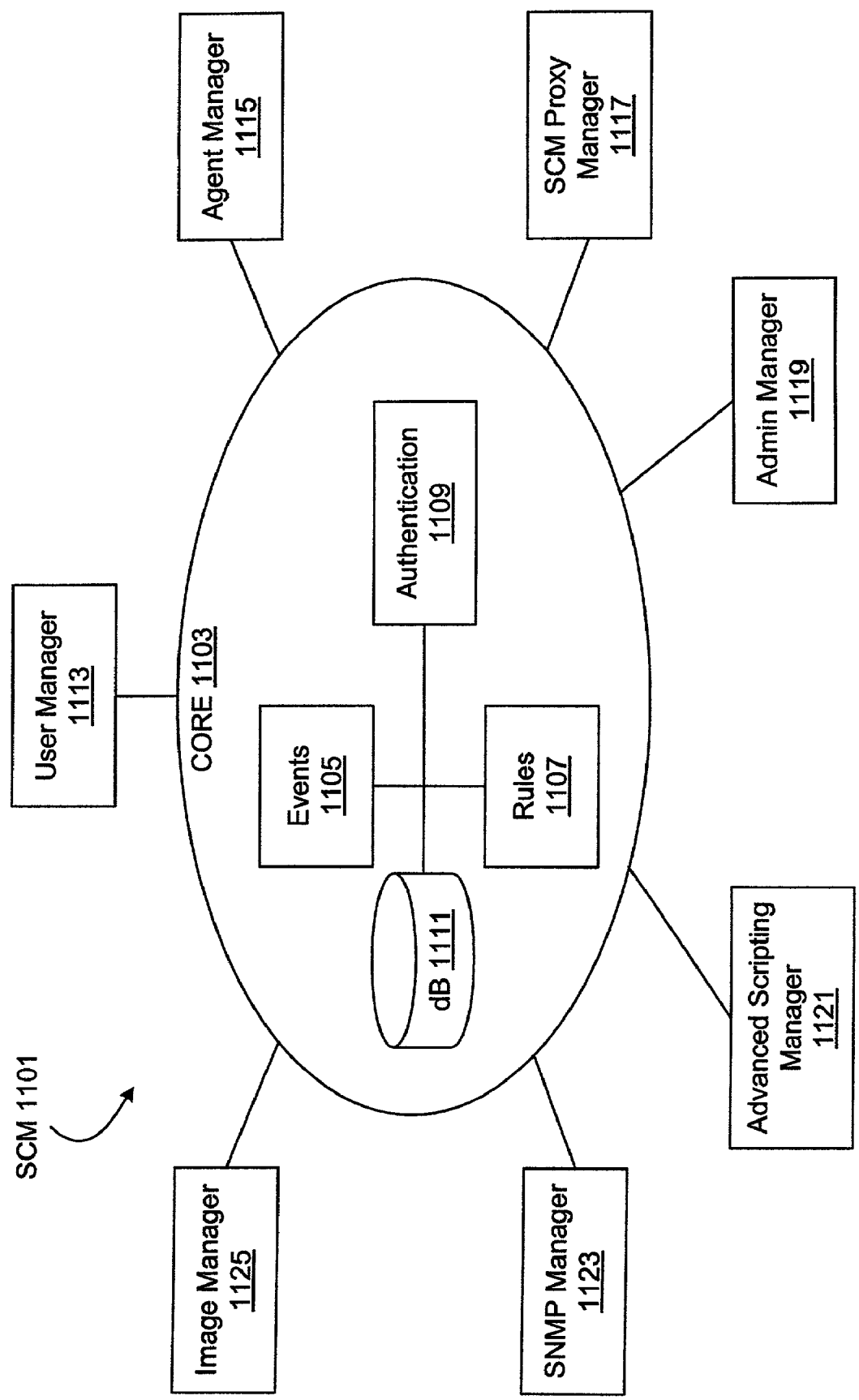
FIG. 11 is a block diagram illustrating the fundamental components of an SCM of a server cloud including core components and interface modules.

FIG. 11 is a block diagram illustrating the fundamental components of an exemplary SCM 1101 of a typical server cloud, where the SCM 1101 includes core components 1103 and interface components that define how the SCM operates within the cloud and how it interfaces external entities including other SCMs. The core components 1103 of the SCM 1101 include an events engine 1105, a rules engine 1107, an authentication engine 1109 and a database 1111. The core components 1103 comprise a shared library of functions used by all SCM components and interface components. The interface components are considered part of the SCM 1101 and establish interface with external entities, such as users, administrators, agents, other SCMs, or other applications, such as management applications, billing applications, resource applications, etc.

The database 1111 stores data and parameters associated with the SCM 1101 and generally defines how the SCM 1101 tracks data and information. The database 1111 is integrated with the core engines and may even incorporate all or substantial parts of the core engines. The database 1111 includes, for example, data validation, data formatting, and rules validation. The event engine 1105 controls and manages all of the events to be performed by the SCM 1101, where such events are either immediately performed or queued for later execution. It is noted that "commands" and "actions" are generally synonymous and that "events" are commands or actions being performed or that represent an actual request to implement one or more commands. The rules engine 1107 ensures that the SCM 1101 operates in a consistent manner with respect to data and information and applies the appropriate level of security for each operation. The operations of the SCM 1101 follow specific requirements and rules as validated and enforced by the rules engine 1107, including, for example, credential and role information. The authentication engine 1109 is used to validate users (explicit rights) and agents (implicit rights) and to generate and issue tokens or similar security credentials. For example, if the credentials provided by a user (or entity) are valid and recognized by the authentication engine 1109, the authentication engine 1109 generates and assigns a temporary token that is used by that user for each subsequent access during the current session until logoff. All subsequent accesses by the user require the assigned token. Tokens may be computer-generated alphanumeric or binary values temporarily assigned to each user. The authentication engine 1109 accesses the database 1111 to assign the corresponding privileges attached to each role to the authenticated user according to that user's role or authorizations.

The SCM 1101 may include one or more interface components that implement an interface layer, such as managers that implement interfaces with specific-type entities. Each interface component has its own needs and methods requirements and is designed to handle the operation of commands for specific entities. As shown, the interface components include a user manager 1113, an agent manager 1115, an SCM proxy manager 1117, an administrator manager 1119, an advanced scripting manager 1121, a simple network management protocol (SNMP) manager 1123, and an image manager 1125. The interface component managers shown and described herein are exemplary only, where each is optional depending upon the particular configuration and design criterion and where additional interface components may be defined, generated and deployed in a similar manner. Each SCM will have at least one interface component.

The user manager 1113 manages access to the SCM 1101 and the resources of the associated server cloud by users as previously described. The user manager 1113 builds appropriate user interfaces and translates SCM data into useful screens or renderings for display or consumption by each user. The agent manager 1115 coordinates SCM events with the appropriate agent(s) or other system components within the associated server cloud, such as physical server agents (PSA), logical server agents (LSA), etc. The SCM proxy manager 1117 enables communication with other SCMs including proxy operations as described herein. The administrator manager 1119 incorporates scripting logic and renders user interface(s) to administrators and provides useful access and control of the SCM 1101 and the server cloud and associated functions to one or more administrators. The advanced scripting manager 1121 enables a more sophisticated scripting interface with other management systems, such as a billing package or the like. The SNMP manager 1123 enables communication with an SNMP management system or entity. The image manager 1125 enables optimized use of storage resources and files throughout the entire domain of the SCM 1101, including the physical and logical resources of its home cloud and the resources within subclouds of other server clouds.

Figure 12:
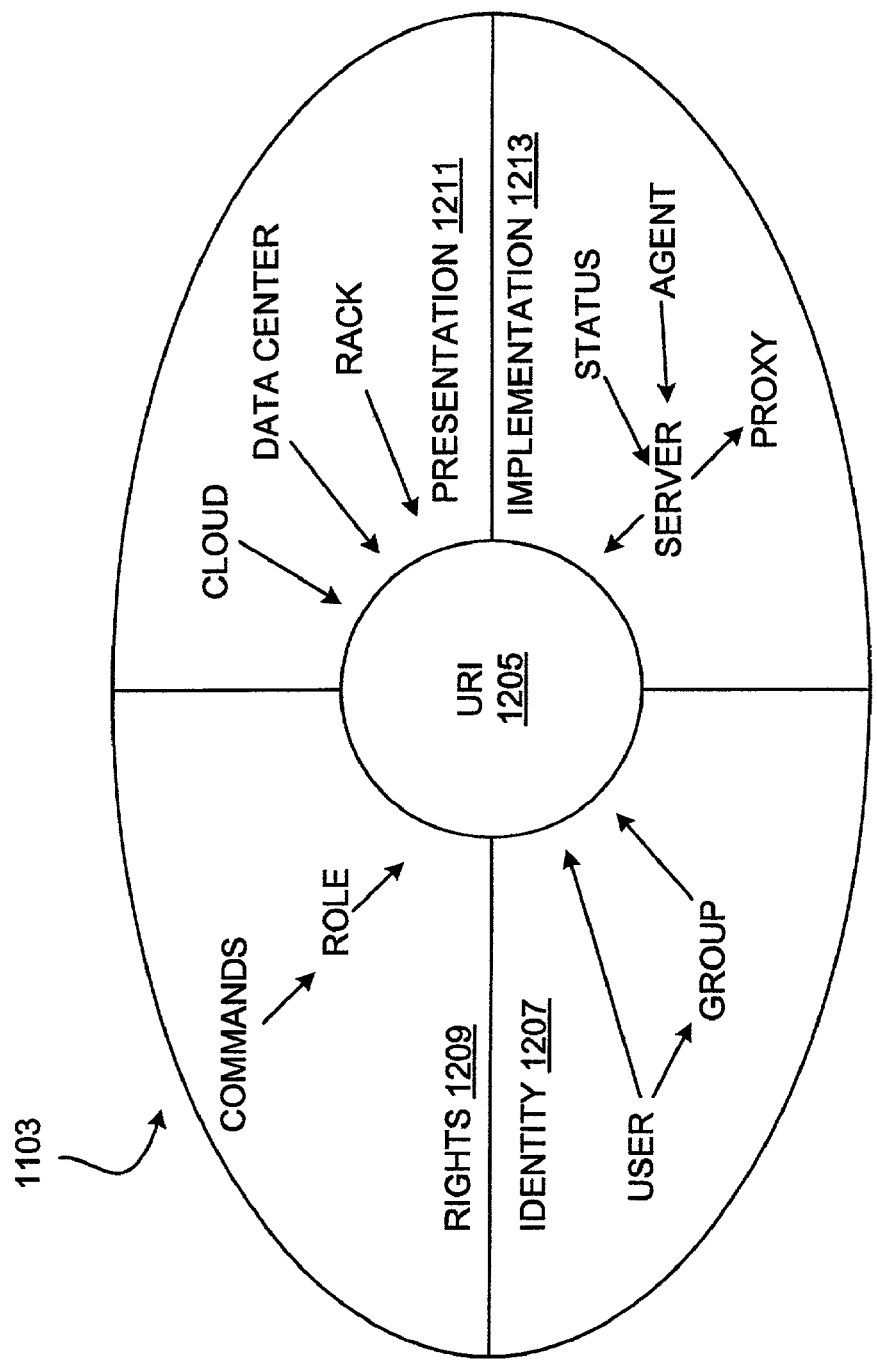
FIG. 12 is a figurative block diagram that illustrates relationship mapping between data and information and the associated syntax employed by core components of the exemplary SCM of FIG. 11.

FIG. 12 is a figurative block diagram that illustrates relationships between data and information and associated syntax employed by the core components 1103 of the exemplary SCM 1101. The SCM 1101 serves as a gateway to the resources and services within its associated server cloud including its logical servers, physical servers and/or proxied servers. A central aspect of the core components 1103 is a URI 1205, which is a handle that provides the complete context information for the SCM 1101. In general, the URI 1205 is a naming convention or key that describes the relationship between different components within the SCM 1101. The URI 1205 essentially unifies different aspects of information and data managed by the SCM 1101. The core components 1103 use the URI 1205 mapping as a syntax that maps between different types of data. The URI 1205 is a bridge point between different aspects or functions of the core components 1103, and includes an identity aspect 1207, a rights aspect 1209, a presentation aspect 1211 and an implementation aspect 1213.

From a syntax point of view, the URI 1205 maps to particular resources of the server cloud, such as a logical server. Every interaction within the SCM 1101 has 3 components including an identity (identifying a user, agent, other cloud, etc.), an URI defining the target resource or server, and a command or action. For example, a user USER1 (identity) may request a SHUTDOWN (command) to shut down a logical server LS1 (located by URI). The URI 1205 serves as a mapping between information in that given URI plus any other one aspect provides enough information to determine other aspects. For example, a URI plus the identity of a user provides sufficient information to determine the rights or roles assigned to that user for a given logical server (such as commands that are authorized for the user of a target logical server) as well as the physical implementation aspect that defines the physical resources effected by the command.

The core components 1103 combine multiple types of data to compose or execute actions and user interface (UI). Actual work is done by the SCM 1101, which can be execution of an action or rending UI. The core components 1103 employ the identity aspect 1207 to determine the identity ("who") of the entity requesting an action to be performed. The entity or user may comprise an individual or a group of individuals. A user attempting to access the server cloud must first present valid credential information, such as a username and password or the like, which identifies the user to the SCM 1101. Each user has unique credentials which map to a corresponding role. Each individual user may be assigned separate and unique credentials within a given user group and/or users within a given user group may be assigned to the same role with different credential information. The rights aspect 1209 incorporates predetermined roles assigned to each entity or user that defines what that entity is allowed do. Each role defines the rights and privileges assigned to one or more users as enforced by the rules engine 1107, such as which commands are authorized for a particular user or entity.

The presentation aspect 1211 includes the logical or virtual relationships that define how information is to be presented. There are many presentations or paths to the SCM 1101 of a server cloud and to its resources. The paths may be represented by addresses or the like according to any predetermined syntax or protocol. The presentation aspect 1211 incorporates various paths or logical representations to access one or more logical servers or other resources within the server cloud. The presentations aspect 1211 defines various access paths to the servers and resources within (or proxied by) the server cloud. Different presentations may correspond to different privileges. Each role may map to one or more presentations within the presentation aspect 1211. Generally, each role maps to the highest level presentation authorized for that role. The presentation aspect 1211 incorporates a logical identity of server cloud, and may optionally include other logical representations, such as Data Center and/or Rack representations depending upon the particular configuration.

The implementation aspect 1213 determines which physical resources or equipment of which cloud is effected by an action or command. A requested action may be sourced from an agent of a logical or physical server or sourced externally to be performed by a logical server within the server cloud or within another cloud or subcloud via proxy. The command or action may include the status of any given logical server within the cloud or proxied by the cloud. It is noted that the implementation aspect 1213 enables server abstraction so that logical servers may be abstracted from the underlying hardware. The implementation aspect 1213 also enables scripting abstraction in that action scripts initiated by users or agents that might otherwise be invalid because of transparent physical changes are transparently handled by SCMs. The implementation aspect 1213 manages the relationship between logical and physical resources transparently to the user. Abstraction enhances scalability and maintenance because it simplifies server operation. Although virtualization software employing virtualization techniques may be employed as described herein, alternative abstraction technologies may be employed.

A user may have rights to a logical server (LS1) via the SCM regardless of rights of the physical server (PS1) to which the logical server is linked. The user may have no direct rights at all with respect to PS1 and may even lack any knowledge whatsoever of the PS1. The SCM, however, controls and maintains the LS1 and PS1 relationship for controlling operations initiated by an authorized user. The SCM manages changes in relationships between components transparently to the users and agents. For example, the user may initiate a script to shutdown LS1 on PS1, copy LS1 to PS2, start LS1 on PS2 and create a user on the moved LS1. The SCM validates the shutdown, copy, start and create requests for LS1 on behalf of the user. The SCM may re-map or route the requests to PS1 and PS2 and authenticate the requests as valid. PS1 and PS2 act on the user-initiated requests as authorized by the SCM and the SCM re-maps feedback to LS1. The implementation aspect 1213 enables scripting abstraction since the LS context is the only context needed to manipulate the LS instance for both its logical and physical attributes. Thus, scripting is global in the sense that a script that is valid for one physical relationship remains valid regardless of the physical configuration or LS location since the SCM transparently maintains the relationships to control actions and operations without requiring scripting modifications from the perspective of the user. The SCM may modify scripting and procedures in accordance with the specific relationships at the time action is necessary (e.g., re-mapping), but such is handled and controlled transparently by the SCM. In this manner, even though it appears to the user that the entire operation is handled directly, the actual control mechanisms are transparently controlled by the SCM on behalf of the user.

The following exemplary messaging structure illustrates an Agent Request, which is a request for a physical server agent (PSA), logical server agent (LSA) or SCM to perform one or more specific actions:

EXAMPLE

```
<?xml version="1.0" encoding="utf-8" ?>
<request>
    <header>
        <to>
            <class>AGENT</class>
            <identifier>PT.NO.DEV.DEV1DCAA</identifier>
        </to>
        <from>
            <class>SCM</class>
            <identifier>PT</identifier>
            <authentication type="intrinsic" />
        </from>
        <date>11 Nov 2001 16:59:59 GMT</date>
        <response request="yes"
path="http://dev1.protier.com/services/callback.aspx" />
    </header>
    <action type="password change" id="98fu207sg">
        <parameter name="user" value="dev-jsmith"/>
        <parameter name="domain" value="DEV1"/>
        <parameter name="new password" value="waffles"/>
    </action>
</request>
```

An Agent Response is generated in reply to an Agent Request, once the specified agent has completed the request. A response is only generated if the initial request included a valid response block. The following exemplary messaging structure illustrates an Agent Response:

EXAMPLE

```
<?xml version="1.0" encoding="utf-8" ?>
<response>
    <header>
        <to>
            <class>SCM</class>
            <identifier>PT</identifier>
        </to>
        <from>
            <class>AGENT</class>
            <identifier>PT.NO.DEV.DEV1DCAA</identifier>
            <authentication type="intrinsic" />
        </from>
        <date>11 Nov 2001 17:06:12 GMT</date>
        <response request="no"/>
    </header>
    <action id="98fu207sg">
        <code>SUCCESS</code>
        <message>The password for user DEV1/dev-jsmith has been changed.</message>
    </action>
</response>
```

Although a system and method according to the present invention has been described in connection with one or more embodiments, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A server cloud system, comprising:
at least one virtualized server system comprising at least one physical server having a central processing unit (CPU) and memory incorporating virtualization technology, wherein said at least one virtualized server system implements a plurality of virtualized logical server clouds;
said plurality of virtualized logical server clouds comprising a first server cloud including a first server cloud manager (SCM) and a first logical server, wherein said first SCM comprises a first SCM interface; and
said plurality of virtualized logical server clouds comprising a second server cloud including a second SCM with a second SCM interface;
the first and second SCMs cooperate through said first and second SCM interfaces to manage operation of the first logical server.

2. The server cloud system of claim 1, wherein the first and second SCMs are configured to cooperate to move the first logical server from the first server cloud to the second server cloud.

3. The server cloud system of claim 1, further comprising:
the second server cloud including a second logical server; and
the first and second SCMs being configured to cooperate to ensure that only one of the first and second logical servers is active at any given time.

4. The server cloud system of claim 3, wherein the first logical server is activated during a first time period and is placed in standby during a second time period, and wherein the second logical server is activated during the second time period and placed in standby during the first time period.

5. The server cloud system of claim 1, wherein the first and second SCMs are configured to cooperate to replicate the first logical server to a second and unique logical server within the second server cloud.

6. The server cloud system of claim 1, wherein the first and second server clouds have a trust relationship and wherein the first and second SCMs are peers.

7. The server cloud system of claim 6, wherein the first logical server is within a subcloud of the first server cloud and wherein the second SCM has rights over the subcloud.

8. The server cloud system of claim 1, further comprising:
an intermediary that has a trust relationship with the first and second server clouds; and
wherein the first and second server clouds cooperate with each other through the intermediary.

9. The server cloud system of claim 8, wherein the first and second SCMs are configured to cooperate via the intermediary to move the first logical server from the first server cloud to the second server cloud.

10. The server cloud system of claim 8, further comprising:
the second server cloud including a second logical server; and
the first and second SCMs being configured to cooperate via the intermediary to ensure that only one of the first and second logical servers is active at any given time.

11. The server cloud system of claim 8, wherein the first and second SCMs are configured to cooperate via the intermediary to replicate the first logical server to a second and unique logical server within the second server cloud.

12. The server cloud system of claim 1, wherein the second SCM operates as a proxy for the first logical server so that the first logical server may appear to exist within the second server cloud while actually residing in the first server cloud.

13. The server cloud system of claim 1, further comprising:
the first server cloud including a second logical server; and
wherein the second SCM operates as a proxy for the first and second logical servers and wherein the first and second SCMs are configured to cooperate to ensure that only one of the first and second logical servers is active at any given time.

14. The server cloud system of claim 1, wherein the second server cloud is an exchange cloud that employs intercloud proxy and commercial terms to enable commercial transactions associated with resources within the first server cloud.

15. The server cloud system of claim 14, wherein the first and second server clouds establish a commercial relationship for the purpose of enabling the second server cloud to direct use and resell logical server resources in the first server cloud.

16. The server cloud system of claim 14, further comprising:
a third server cloud having an authorized user, the third server cloud having a commercial relationship with the exchange cloud; and
wherein the authorized user gains access to the first logical server active in the first server cloud via intercloud proxy via the exchange cloud.

17. The server cloud system of claim 14, further comprising:
a third server cloud having a commercial relationship with the exchange cloud; and
the exchange cloud transferring the first logical server from the first server cloud to the third server cloud for access by an end consumer.

18. The server cloud system of claim 17, wherein location of the first logical server is transparent to the end consumer.

19. The server cloud system of claim 17, wherein transfer of the first logical server is performed by the exchange cloud transparently to the end consumer.

* * * * *